United States Patent
Lim

(10) Patent No.: US 8,089,943 B2
(45) Date of Patent: Jan. 3, 2012

(54) DATA COMMUNICATIONS BETWEEN SHORT-RANGE ENABLED WIRELESS DEVICES OVER NETWORKS AND PROXIMITY MARKETING TO SUCH DEVICES

(75) Inventor: Soon Hock Lim, Petaling Jaya (MY)

(73) Assignee: Soon Hock Lim, Petaling Jaya, Selangor (MY)

( * ) Notice: Subject to any disclaimer, the term of this patent is extended or adjusted under 35 U.S.C. 154(b) by 0 days.

(21) Appl. No.: 13/183,252

(22) Filed: Jul. 14, 2011

(65) Prior Publication Data

US 2011/0270680 A1 Nov. 3, 2011

Related U.S. Application Data

(63) Continuation of application No. 12/164,259, filed on Jun. 30, 2008, now Pat. No. 8,005,057.

(60) Provisional application No. 61/047,001, filed on Apr. 22, 2008.

(51) Int. Cl.
*H04W 4/00* (2009.01)
*G06Q 30/00* (2006.01)

(52) U.S. Cl. .................. 370/338; 705/14.64

(58) Field of Classification Search .......... None
See application file for complete search history.

(56) References Cited

U.S. PATENT DOCUMENTS

| | | | |
|---|---|---|---|
| 6,647,257 B2 * | 11/2003 | Owensby | 455/414.1 |
| 7,912,448 B2 * | 3/2011 | Hinrikus et al. | 455/404.2 |
| 8,005,057 B2 * | 8/2011 | Lim | 370/338 |
| 2003/0054767 A1 * | 3/2003 | Mandhyan et al. | 455/555 |
| 2003/0100315 A1 | 5/2003 | Rankin | |
| 2006/0229014 A1 * | 10/2006 | Harada et al. | 455/41.2 |
| 2007/0121525 A1 * | 5/2007 | Jenster | 370/252 |
| 2007/0286171 A1 * | 12/2007 | Guan | 370/356 |
| 2008/0172291 A1 | 7/2008 | Hurowitz et al. | |
| 2008/0172307 A1 | 7/2008 | Hurowitz et al. | |
| 2008/0221998 A1 | 9/2008 | Mendelsohn et al. | |
| 2008/0287150 A1 * | 11/2008 | Jiang et al. | 455/466 |
| 2009/0017798 A1 | 1/2009 | Pop | |
| 2009/0055554 A1 * | 2/2009 | Moore et al. | 709/249 |
| 2009/0147778 A1 * | 6/2009 | Wanless et al. | 370/389 |
| 2010/0137036 A1 * | 6/2010 | Bucher et al. | 455/566 |
| 2011/0115618 A1 * | 5/2011 | Catten et al. | 340/439 |

* cited by examiner

*Primary Examiner* — Anh-Vu Ly
(74) *Attorney, Agent, or Firm* — Marsh Fischmann & Breyfogle LLP; Kent A. Lembke

(57) ABSTRACT

A method for allowing short-ranged communication devices to communicate with each other using the Internet. Cell servers are provided in first and second zones linked to the Internet and adapted for transmitting voice and other digital data over the Internet such as using VoIP. The method includes registering users of short-range enabled devices, such as Bluetooth cell phones, with a communication system and storing a device identifier along with a user ID and password. A contact list is stored for each registered user. The method includes a registered user entering a cell serviced by a server, the server discovering the user's device, logging the user into the system based on the device identifier and an entered user ID and password, receiving a communication request to chat with one of the listed contacts, and establishing a communication session using time previously awarded to the user for receiving marketing content.

22 Claims, 16 Drawing Sheets

DATA COMMUNICATIONS BETWEEN SHORT-RANGE ENABLED WIRELESS DEVICES OVER NETWORKS AND PROXIMITY MARKETING TO SUCH DEVICES

CROSS-REFERENCE TO RELATED APPLICATIONS

This application is a continuation of U.S. patent application Ser. No. 12/164,259, filed Jun. 30, 2008, entitled "Data Communication Between Short-Range Enabled Wireless Devices Over Networks and Proximity Marketing to Such Devices," which claims the benefit of U.S. Provisional Application No. 61/047,001 filed Apr. 22, 2008, which are incorporated herein by reference in their entireties.

BACKGROUND OF THE INVENTION

1. Field of the Invention

The present invention relates, in general, to communications between short range wireless devices such as Bluetooth-enabled devices, and, more particularly, to computer software, hardware, and computer-based methods for allowing short range wireless devices to communicate over digital communication networks such as the Internet such as may significantly increase the range of such devices and allow users to have voice communications or chats with other users of short range wireless devices. The present invention is also related to proximity marketing methods and systems.

2. Relevant Background

Proximity marketing allows companies to distribute advertising contents associated with a particular place using localized wireless communication technologies such as Bluetooth, Wi-Fi, WiMAX, GSM, or the like. Transmissions can be received by individuals near the store or locale associated with the advertising who have indicated that they wish to receive the contents and have the equipment necessary such as a Bluetooth-enabled cellular phone (cell phone) or other electronic devices such as a computer, a wireless game console, or the like. The location of a user's wireless device may be determined by the cell phone being in a particular cell, a Bluetooth, Wi-Fi, or other communication protocol-enabled device being within range of a transmitter supporting that protocol, an Internet-enabled device with GPS (Global Positioning System) technology enabling it to request localized contents from Internet servers, or the like. Proximity marketing may be used to distribute contents in a variety of media (such as video, sound, text, and so on).

In the proximity marketing space, there are systems of solutions that assist owners (e.g., store owners, sporting event center owners, and the like) to disseminate rich media (e.g., video, pictures, sounds, texts, business cards, and the like) content to the wireless devices in the proximity or area about their store or facility via the use of technologies like Bluetooth, Wi-Fi, and other short-range communication techniques. In some applications of proximity marketing, a general strategy involves networking or linking together a web of users in the proximity of an advertiser so that the media contents received by the targeted devices may be further disseminated to others who are linked or associated with those who directly receive the marketing messages or contents, and this strategy or method is known as viral marketing.

By targeting the devices in the proximity of the systems deployed, the media owners or parties associated with the advertising intend to share some marketing messages with the various owners of the devices in the proximity. In places where the public congregate, which may be the stores of the retailers or the wholesalers, theatres, cinemas, shopping malls, museums, airports, train or bus stations, exhibition centers, and the like, the public in the proximity of the systems may be invited to participate in some forms of marketing campaigns by the media owners. Through such marketing campaigns, the public who opt in to participate may receive marketing brochures, catalogues, discount offers, or product information packs in the form of digital files. Such files are sent by the systems via such technologies like Bluetooth, Wi-Fi, WiMAX, GSM, 3G, or the like. Such a form of rich media advertising allows the recipients to carry with them the marketing contents received in their own devices.

In so doing, the owners of the targeted devices become aware of the presence of the brands and the presence and nearby location of the media owners (e.g., to buy clothes at a nearby store, to see a show at the theatre around the corner, to eat at a particular restaurant, and so on). Such situational awareness of the brands and the rich media contents may be used to direct the flow of traffic of the visiting or passing-by crowd towards the enterprises and/or the premises of the branded products/services or the media owners/advertisers. Through the creative use of the proximity marketing systems, the flow of the passing-by crowd may be redirected so as to help generate a positive flow of traffic of potential customers towards the premises and/or the enterprises. Unfortunately, the flow of such traffic may be short-lived (e.g., the effectiveness of proximity marketing may decline over time) because the passing-by crowd of the potential customers may grow impatient and/or indifferent about the presence of such media contents (e.g., users may ignore or not notice additional advertising or may quickly delete the contents from their wireless device).

Hence, users and creators of proximity marketing are continuously looking for better ways to not only identify a target audience of potential buyers or clients for contents but also ways to attract potential customers to a locale and to link the potential customers so as to cause the advertising to be spread (e.g., to like-minded shoppers, people with similar demographics, and the like to support viral marketing and cause the advertising or content distribution to be more effective and far reaching).

SUMMARY OF THE INVENTION

To address the above and other problems, the present invention provides methods and systems for enabling users of short-range wireless devices such as, but not limited to, Bluetooth-enabled devices to communicate with others over a digital communication network (such as the Internet) at no cost or financial obligation. Generally, the communication service will include at least voice communication between a user of a short-range wireless device and another person who may be in the same location (e.g., physical area or zone) or in a distance location (e.g., another physical area or zone with the service provider servers/systems linked via a digital communication network). In exchange for the free communication service, a user may agree to receive a quantity or volume of rich media contents (e.g., information about a locale/facility, advertising or marketing contents relevant to the locale or more general brand/product/service awareness messages).

In some cases, a predefined unit or volume of media contents is associated with a set or unit of use of the communication service such as 10 minutes of communication service for receiving 5 text advertisements, for listening to 1 audio message, and/or for viewing 1 video. The amount of free chat or talk time may also be determined by the amount and type of response and interaction provided by the user of the device. For example, users may have their chat time (or minutes) increased a first amount for agreeing to receive proximity contents (such as an advertisement) and increased a second amount if they take additional action such as viewing the contents and providing responsive input (e.g., answer a questionnaire or poll, purchase a product based on the contents, which may include a discount/coupon valid for an upcoming period of time, forward the advertisement to the people on their contact list, and so on). In some embodiments, the other parties to the communication also receive the media contents so as to more effectively spread the transmitted media contents or messages (e.g., a person near a shoe store may access the service and agree to receive an advertisement for a shoe sale or brand of shoes and a user of another wireless device that they communicate with over the service may also be sent the same advertisement so that it is not only marketing to the local or proximate person but also to the person contacted by that local person/shopper).

The inventor recognizes that voice chat is a crucial form of communication that bridges the gaps in people, and it is an enabling facility that brings people together. There are many VoIP (Voice over Internet Protocol) systems in the market that allow users to chat online without charge. Some even offer such facilities to users to communicate from their smart phones, expensive PDAs (Personal Digital Assistant), and other high-end devices. However, most of the cell phones presently available in the market are not smart devices nor are they expensive PDAs. But, among the standard cell phones, close to 90% of the cell phones are Bluetooth-enabled or some other form of short-range radio or wireless communication, thereby creating a huge market opportunity ready to be tapped into when combined with proximity marketing and VoIP technologies (and other digital network-based communication and data transfer capabilities) according to the inventive techniques described herein.

In some embodiments of the invention, the methods and systems are addressing this inventor-recognized need to make voice chats or communications directly from the cell phones or other short-range enabled devices by making use of some integrated networks (such as the Internet and servers or other computer devices/systems linked to the Internet), connecting the interested parties together, and enabling them to initiate voice chats, text messaging, and/or other communications (all may be considered "chats") from their cell phones/devices typically without charge (in some embodiments, though, fees may be charged initially such as a low fee to enter a physical location where chats are completed or on a periodic basis such as a monthly fee for being a registered user of the service). In one specific example, the methods and systems of the invention are implemented using Bluetooth technologies, and in these cases, the methods and systems integrate an IP-based network (e.g., to transfer digital information including that associated with VoIP) with that of Bluetooth radio (e.g., to allow a user's device to communicate in a wireless manner with a local or proximity server or radio/computer system to access the communication service including registering or logging in as a user and communicating with the IP-based network). Such an integrated network facilitates voice communication among Bluetooth-enabled cell phones or devices.

In the process of sharing rich marketing contents with the users, the inventive communication system quantifies the consent and degree of willingness of the users who opt to receive (and, in some cases, respond to or interact with) the marketing contents. Among other parameters, users are awarded varying numbers of points based on the number of marketing campaigns they participate in, the number of files they receive, the number of re-attempts to receive similar but not duplicated contents, and so on. The number of points accumulated may then be converted, in some embodiments, to the equivalent or a set amount of free talk credit time based on the scope of the marketing campaigns and the size of the participating brand or media owners. For example, the more participating brand or media owners or the larger the marketing campaigns are in terms of the allocated budgets, the more award points are convertible into free talk credit time by the respective users participating in the associated marketing campaigns. Such a flexible form of converting award points into the equivalent free talk credit time serves to promote greater participation by the users. As noted above, the amount of free talk credit time may also be determined based on the user's willingness to take further actions or their responsiveness to the media contents, marketing data, or market survey. For example, a user who answers a poll or provides feedback on various contents may receive more free talk credit lime compared to a user who only provides requested demographic data. In some cases, users may obtain additional free talk credit time by making a purchase (with the purchase automatically being reflected in their account by increasing minutes similar to earning flight miles by use of particular credit cards or by manual data or code entering by the user using information on their receipt or by a sales clerk who enters data) or even by visiting a portion of a store/facility (presence within a particular cell or subcell may be detected/determined by a server and their free talk credit time may be increased to reward them for responding to such a request such as may be desirable to view a new line of merchandise or the like).

By availing or providing a facility that allows the users of cell phones and other wireless devices to effect voice communication directly from their cell phones (typically without charge), the integrated communication system of the invention increases the duration of potential stay of each passing-by visitor at the premises or the enterprises of the media owners. In other words, some embodiments may actually encourage a user of a device to remain within a particular cell such as by providing communication service only within that cell, by providing additional free talk credit time based on a length of stay or presence of the user's device which is Bluetooth-enabled and discoverable within the cell or with other techniques. In other cases, though, the user is free to roam between adjacent and/or proximate cells without loss of the communication service. The Bluetooth proximity marketing part of the system (a proximity marketing or content distribution system or assembly) helps to direct the flow of traffic of the passing-by crowd towards the premises or the enterprises while the communication (e.g., voice chat) enabling part of the system helps to prolong the duration of potential stay of the passing-by visitors at the premises or the enterprises. In essence, the integrated system helps to drive traffic of the potential customers towards the premises or the enterprises of the business owners and also to disseminate their marketing messages to the targeted users in the proximity while providing a communication service or channel typically without charge to the general users.

In standard mobile telecommunication systems, a user is required to have a registered SIM (subscriber identity module) card to make a telephone call with a remote contact. If his SIM card is lost, someone may use his lost SIM card to make calls at his expense. Such a risk of unauthorized use of a SIM card may be reduced when it is security locked with a password. In part to address this problem with prior systems, users of the described communication systems are typically required to register for authorized access with their preferred Bluetooth-enabled devices. In a registration session, the unique 6-byte hexadecimal Bluetooth ID of the preferred Bluetooth-enabled device is identified and associated with the login credentials of the registering user. In some preferred embodiments, the unique 6-byte hexadecimal Bluetooth ID is registered together with the selected user ID and password as a single entity. If a user registers successfully, the user logs in to the system for subsequent accesses in the presence of the preferred device, and, in some embodiments, without the presence of the registered device (and its unique ID) his login will be denied. Hence, in these embodiments, the overall user experience of the system is enhanced with more stringent security control.

One embodiment of the invention may be considered as a system for effecting at least voice and text communication (e.g., more generally data communication) among Bluetooth-enabled devices (or some other short-range communication protocol/technology-enabled devices) (such as cell phones and other wireless communication devices, laptops or other personal computers or computing devices, video game consoles, and the like) within the transmission range of Bluetooth cells inter-connected with the Internet. This system of the invention relates generally to the design and the implementation of an inter-connected network of radio cells (collectively, Bluetooth cells) that typically utilize unlicensed radio frequency band, for example Bluetooth protocol operating in the license-free ISM (Industrial, Scientific and Medical) radio frequency band at 2.4-2.4835 GHz. While Bluetooth is mentioned specifically for use in embodiments of the invention, the systems and methods of the invention are not limited to Bluetooth. Through the use of communication plug-ins, the systems and networks described can be integrated with Wi-Fi, WiMAX, GPRS, 3G, or other wireless communication protocols in addition to Bluetooth. But, in the Bluetooth embodiments, each Bluetooth cell in the communication system is managed by a server that is inter-connected via the Internet backbone to a network of similar servers that span or are located in different geographical zones (which may be configured to cover a particular region such as a particular country or portion of such country or may even extend globally to nearly any location with access to the Internet). The inter-connected servers allow users of Bluetooth-enabled cell phones or devices (e.g., utilizing a Bluetooth transceiver in each device) located within the transmission range of each Bluetooth cell to make and receive at least text messages and voice calls from their cell phones to users of Bluetooth-enabled cell phones in other Bluetooth cells within the network while being able to receive contents/messages from the proximity marketing or advertisement distribution portion of the system (e.g., contents relative to their locale or the locale of the other users they are communicating with via the communication system).

More particularly, a computer-based method is provided for facilitating communication between short-range wireless devices over the Internet or other digital communication network. The method includes providing first and second servers (such as cell servers servicing a cell about the servers) that are communicatively linked to a digital communication network (e.g., the Internet). Each of the cell servers is adapted for communicating wirelessly with short-range (e.g., less than 300 meters and in some cases less than about 100 meters) wireless devices (such as, but not limited to, Bluetooth-enabled devices including cell phones with the devices and servers typically each including a Bluetooth transceiver and/or Bluetooth plugins). The method also includes user device detection with the first cell server a user device, which is adapted for short-range wireless communication, within the first cell, and the detecting typically includes determining an identifier such as the Bluetooth ID of the user device. Based on the device identifier, the method may include retrieving a contact list form memory that lists a set of users of communication devices (which are, in some but not all embodiments, adapted for short-range wireless communication). A request may be received from the detected user device to communicate with a selected target of the user devices on the contact list. Then, the method may include establishing a communication session between the detected user device and the target user device, with the session including transferring communication data or otherwise between the detected user device and the target user device via the first server, the communication network, and the second server. The transferred data often will include both the communication data (like voice, video, or picture) and the non-communication data (like control or error correction), voice data, and the first and second servers may be configured to support the Voice over Internet Protocol (VoIP) such that the voice messages received at the first and second servers may be converted into digital data according to the VoIP prior to being transmitted between the two servers over the network (e.g., the Internet or the like). The method may include providing a user of the devices a particular amount of available talk credit time to consume in the communication sessions (e.g., the requesting user's time typically is consumed) for initial registering with the communication system, and the method may include sending a request to transmit media contents/data to the user via their user device, receiving consent, and in response to the consent increasing their available amount of talk credit time. The amount of time awarded may differ for differing types of media (such as one amount for a text message, a second amount for a video, a third amount for advertising media from a particular marketing source, and so on) and talk credit time may also be awarded when the user takes an action in response to receiving the media contents (e.g., purchases a product/service, visits a store or display, provides responsive information, and the like). The method may also include presenting a login message or screen on the detected user device, receiving user input in response to the login message including a user ID and user password, and logging the user onto a communication system in part by comparing the user ID and user password to information stored in a user profile/user account with reference to or a link to the device ID (e.g., in some embodiments, the user's use of the communication method/system is tied to use of a particular, registered device).

DETAILED DESCRIPTION OF THE PREFERRED EMBODIMENTS

Figure 1:
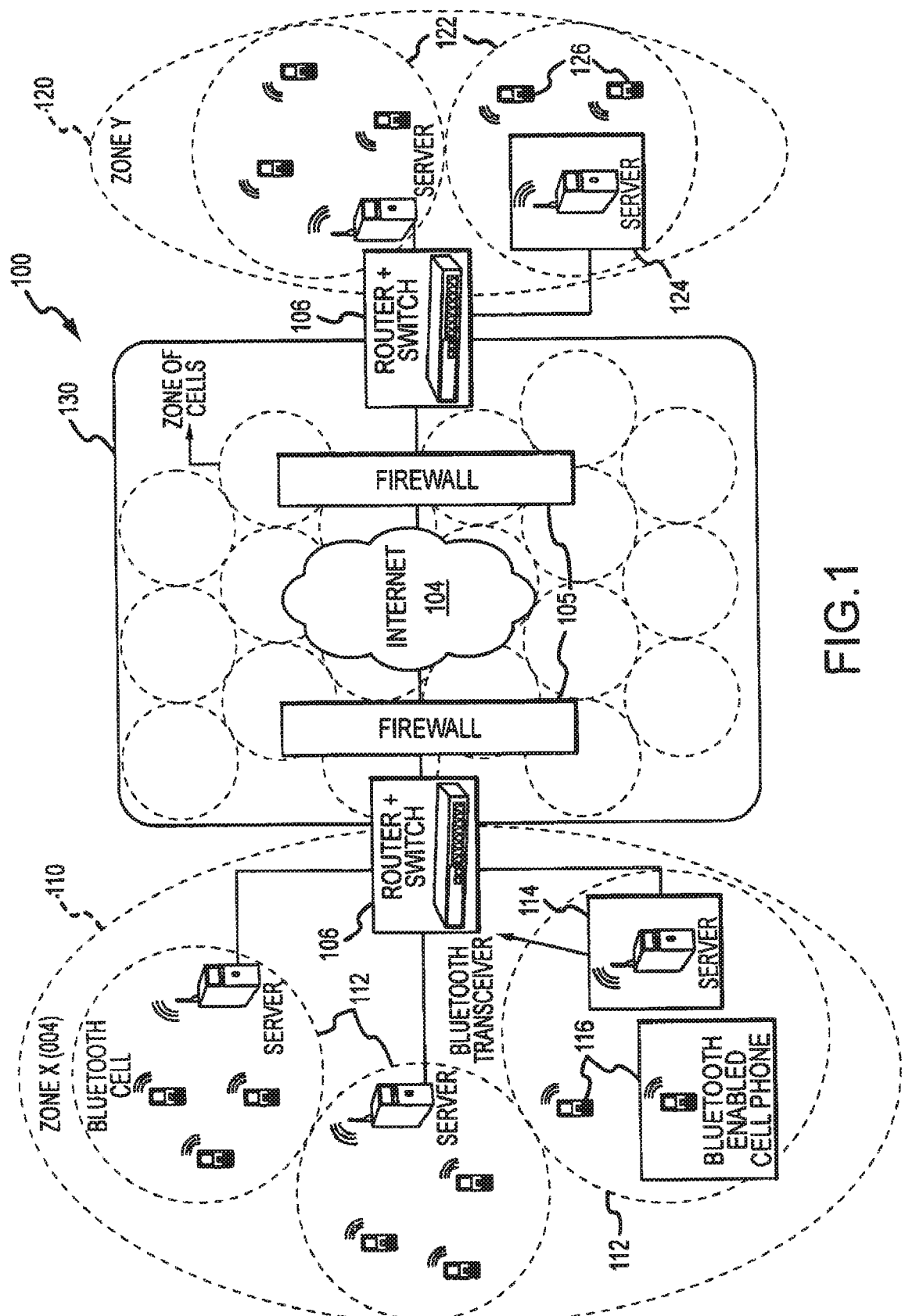
FIG. 1 illustrates in block diagram form a communication system of the present invention illustrating communication zones formed of one, two, three, or more proximity cells or subzones about a short range enabled server (such as a Bluetooth-enabled server) that allows users of short range wireless devices to communicate to users within their proximity cell, within their zone, and/or within another zone via a digital communication network such as the Internet (e.g., using VoIP or similar technology when the communications or chats include voice)

The present invention is directed to computer-based methods and systems for providing users of wireless devices, which are enabled to utilize short-range communication techniques based on Bluetooth or other such protocols, to have "chats" that may involve voice, text, video, or other communication over a digital communication network such as the Internet (e.g., without the use of conventional cellular telephony techniques). The following discussion generally stresses the use of Bluetooth-enabled user devices for short-range wireless communication and VoIP techniques for voice communication over the Internet. These are intended to provide one useful example of implementation technologies/techniques and not to limit the invention as it will be understood that other existing techniques may be used in place of Bluetooth such as Wi-Fi and WiMAX, and it is also likely that newer versions of and replacements for these technologies or protocols will be developed and such later developed short range and over-the-network communication methods and systems may be used to implement the described invention. Prior to turning specifically to the embodiment shown in the figures, a summary or overview of the communication methods and systems of the invention is provided to facilitate full understanding of the specific embodiments (e.g., those shown in FIGS. 1-5).

A typical communication system of the invention includes a number of inter-connected zones, which may be geographically separated, that are connected by the Internet or another digital communication networks (such as LAN, WAN, and/or the like). Each zone in turn may include a number of cells or subzones that are each managed by a server or similar device. Each cell is covered by Bluetooth radio or other short-range communication radio or device, with short-range generally meaning any wireless communication technology that is limited to less than about several kilometers with most implementations being less than several hundred meters with Bluetooth and other implementations often spanning an area of radius between a few centimeters to about a hundred meters. Within a zone, the nearby cells, also known as buddy cells, are connected through their respective servers, thereby aggregating the effective area of coverage by the Bluetooth radio from the communication system to all the cells served by the Bluetooth-enabled servers within the zone. When new cells are added to a zone, the effective area of coverage by the Bluetooth radio is enlarged. The communication system may include one or many zones, and the zones are interconnected by the Internet and/or other networks such that users in one zone may talk or otherwise communicate with users in other zones as well as with users in the same zone.

In a cell that is well covered by the Bluetooth radio (e.g., a server with a Bluetooth radio or transceiver), Bluetooth-enabled and discoverable cell phones that are in the proximity of the cell (e.g., area defined by the range radius of the transceiver) may be detected by one or more servers of the system. Therefore, when a user of a Bluetooth-enabled cell phone goes into the proximity of a cell, the user may be able to connect to the system via a sequence of login steps including the detection, authentication, authorization and verification of the details of the cell phone and the credentials of the user. When a user logs into the communication system, his presence is identified through the identification information or data (e.g. the unique 6-byte hexadecimal Bluetooth ID) associated with his preferred device together with his chosen username or user ID and typically a password. By such an association of the user information, the system will be able to securely identify and locate a user within the network of the servers in the system, thereby allowing such a cell phone to be reached if and when there is a communication request from another registered user of a cell phone (e.g., to determine if another cell phone is within a cell with his cell phone turned on, Bluetooth enabled, and status set for receiving communications).

Once the credentials of the user are verified and authenticated such as by software and hardware provided in the communication system, a more secure channel of communication between the cell phone of the caller and the cell phone of the remote contact can be established. The caller can then initiate voice communication directly from his cell phone with another user's device connected likewise via the communication system servers and the Internet and/or other communication networks. Making use of the available inter-connectivity within the network of the communication system, the communication data is packetized and routed through the Internet (and/or other networks) without incurring additional charges by the conventional telecommunication carriers, thereby enabling the users of the communication system to enjoy free (or low charge) voice calls or other chats conveniently from their cell phones or other devices using the short-range capabilities of the devices.

When a user successfully logged into the system, the presence of the user is determined and hence, any other users who are appropriately authorized may be able to contact the user. When appropriately authorized, a user may simply initiate a communication session with another user who is successfully logged into the system. There are configurable rules that allow users to customize their default preferences of how and when they wish to be contacted. Likewise, users are able to manage their contacts when they are successfully logged into the system. There are status codes that denote the desirable conditions under which the users wish to be contacted, e.g. online, busy, meeting, do not disturb, message only, and the like. Directly from the cell phone or other device of a user, the user is able to initiate a conversation or chat with a remote party who is successfully logged into the system during a conversation or chat session.

When a conversation request reaches the remote party (e.g., other user of the communication system or its communication services), a prompt will be generated on the cell phone of the remote party, informing the remote user of some incoming conversation request. Naturally, the remote user at his discretion may receive or decline such a conversation request directly from his cell phone. If a conversation request is accepted, the actual conversation may proceed until it is terminated by either party (or, in some cases, until the communication system determines that the initiating party's or user's allotted free talk credit time has been fully used or has expired such as in embodiments where users earn or gain free talk credit time or usage by accepting media contents such as advertisements). When either party terminates a conversation, either user may: continue to initiate another conversation with other remote, connected parties; leave the cell of the system; or remain connected without being in chat mode (e.g., to be available to receive call requests from others and/or to receive media contents such as to earn more free talk credit time).

When a cell phone is logged into the system through a server of a cell via Bluetooth, a connection is set up with the server. Within the cell covered by the server, the cell phone user may roam freely while making a voice or other chat. The communication data (sound, text, video, and the like) is relayed via the established Bluetooth connection between the server and the cell phone (or other user device). When the user roams from one cell to another, the current Bluetooth connection may be replaced with a second one when the user steps into another cell. The communication data will be relayed via the subsequent, newly established, Bluetooth connection typically without interruption or need for logging back into the system. While it is technically acceptable (and readily implemented) to support roaming from one cell to another, from the commercial perspectives, the system in some embodiments or implementations may choose or be configured to restrict access to within one cell providing the communication services. A cell may span an area of radius between a few centimeters to about three hundred meters in some cases. Such one-cell type embodiments may be desirable because when a user is required to roam (or remain) within a particular cell to maintain his chat session, the ease with which the organizing marketing campaign or brand owner is able to congregate a crowd of users within the cell is much greater, thereby reinforcing the objective of directing the traffic of the passing-by crowd to the enterprises/premises of the marketing campaign or brand owners. However, many embodiments will allow a user (such as one located at a larger facility such as a mall, region of a city, sporting/entertainment complex, and the like that may be served by two or more cells) to freely move among two or more cells using a pass-along capability of the communication system.

Each user consumes bandwidth and resources during communication, and the communication system may be configured with software modules and memory structures to allocate a certain number of minutes as free talk credit time for each user. Hence, in some embodiments, a user may be provided with a certain amount of free talk credit time for initially registering or for simply coming into the proximity or area associated with a particular server (e.g., a particular Bluetooth cell that may be associated with a particular vendor or distributor of media contents). Each user may then be invited to receive and/or view premium advertisements or other media contents in exchange for additional free talk credit time. The control modules or mechanisms provided in the system and/or in a distributed manner to one or more of the servers may be configured with routines or modules that function to quantify or determine the consent and/or the willingness of a user to view premium advertisements or media contents. Then based on such determinations/quantifications, the system may adjust, or award, additional free talk credit time to the users, which may be consumed for future communication needs via the network. Such consent may be provided on a one-time basis with the consent stored in the memory accessible to the system. For example, a profile or account record for each user may indicate his device(s) ID, username/ID, password, available/earned free talk credit time, and existing consent settings as well as other information such as his list of contacts/buddies, demographic data (in embodiments that gather such data from the users such as in exchange for yet further free talk credit time), and the like. In some cases, a user may earn or be awarded additional free talk credit time for performing an action desired by a cell sponsor or owner (e.g., a manager of the communication system, advertisers or content owners whose media contents are transmitted to the users, and so on). For example, a user may be awarded points on an ongoing basis for making purchases of goods or services from a store or other sellers (e.g., a frequent buyer-type program in which values of purchases are converted to an equivalent amount of free talk credit time in the communication system).

In the following discussion, a number of terms are used that should be taken to mean their general meanings (e.g., as understood by one skilled in the arts), but the following description of these terms may be used as a partial guide to their use in the following paragraphs. For example, communication or data communication generally refer to exchanges of information between or among communicating parties inclusive of voice and textual data and other data forms including audio such as music and sound bytes, video, graphics, or other formats (e.g., any digital messages or contents exchanged between or among user devices that may take many forms). Server refers generally to a unit of computer that offers a suite of services that may be consumed by one or more requestors, who may or may not be subject to authentication and/or authorization, depending on the rules of the services requested (e.g., a computing device with a processor and memory that may run a server program to establish a server/client relationship between the server and a user device and/or another server in the communication system). A responsible server may refer to a server that the user of a cell phone or other device uses as it attempts to connect to the system for the first time. A cell may refer to a physical area of coverage by Bluetooth radio in which Bluetooth-enabled devices (or other short-range wireless communication technology and devices configured for such technology and "Bluetooth" may be replaced by any such technology/protocol in this description) may be discovered by the discovery service module (e.g., a software program or routine run by a processor or CPU) of the controlling server(s) in a zone. Bluetooth-enabled device refers to a device including but not limited to cell phones, smart phones, laptops, personal digital assistants (PDAs), palm devices, iPhones™, and the like with the ability to communicate via Bluetooth radio such as using the license-free 2.4 GHz ISM radio frequency band or the like. Cell phone refers to a cell phone with specifications and resources more limited and scaled down compared to smart phones or personal digital assistants (but Bluetooth-enabled devices may, of course, include such smart phone, PDAs, and the like such as portable computing devices). Zone refers to a physical area that may include a number of cells that are connected via their respective servers, allowing large volume of traffic data to flow at high speeds.

Bluetooth transceiver refers to a unit of service or device/mechanism of the system that collectively manages the complex task of effecting voice calls and other communication for the connected cell phones via Bluetooth radio, integrated with a network of other servers via the global Internet. A computer or server network may refer to a set of computers that are connected together allowing data to flow in the standard Internet Protocol and/or Bluetooth radio (or other wireless communication protocols/technologies). Inter-connected networks refer to a set of networks, which are connected together, allowing data to flow in the standard Internet Protocol or Bluetooth radio. Internet refers to the public network of computers, which are connected globally via the networks that transmit the data using the Internet Protocol. Communication system of the invention refers to the overall collection of components including the cells, the servers, the cell phones and other user devices, the inter-connected networks, the inter-connectivity kits (software/hardware modules) that collectively effect voice and chat communication between or among Bluetooth-enabled devices (e.g. cell phones) within the range of Bluetooth cells integrated with the global Internet, and software/hardware used to implement the computer-based methods/functionalities described with reference to FIGS. 1-3 and elsewhere. Marketing messages (and other media contents) refer to media files (e.g. videos, audio, pictures, photos, texts, business cards, and the like typically in digital form) used to promote an advertiser's products to the public, draw visitors or potential customers to an advertiser's retail store, draw visitors or potential customers to an advertiser's website, and/or to provide information/contents to a user on behalf of an advertiser or content provider. Free talk credit time refers to a finite number of minutes (or other set or amount of time) awarded to registered users of the communication system. The minutes or time may be used by the users to make free voice communication or other chats with their buddies or contacts (or others available via the communication system). Free talk credit time may be increased based on the consents and the degree of willingness of the registered users to view premium marketing messages managed by the communication system. Likewise, free talk credit time may be reduced when the registered users utilize the five talk credit time to have chat or data communication sessions with their buddies or contacts (or other users of the communication system) over the network(s) made available by the communication system.

The functions and features of the invention are described as being performed, in some cases, by modules, mechanisms, routines, servers, and the like that may be implemented as software running on a computing device and/or hardware. For example, the communication and media content distribution methods, processes, and/or functions described herein may be performed by one or more processors or CPUs running software modules or programs. The methods or processes performed by each module are described in detail below typically with reference to functional block diagrams, flow charts, and/or data/system flow diagrams that highlight the steps that may be performed by subroutines or algorithms when a computer or computing device runs code or programs to implement the functionality of embodiments of the invention. Further, to practice the invention, the computer, network, and data storage devices and systems may be any devices useful for providing the described functions, including well-known data processing and storage and communication devices and systems such as computer devices or nodes typically used in computer systems or networks with processing, memory, and input/output components, and server devices configured to generate and transmit digital data over communication networks. Data typically is communicated in a wired or wireless manner over digital communication networks such as the Internet, intranets, or the like (which may be represented in some figures simply as connecting lines and/or arrows representing data flow over such networks or more directly between two or more devices or modules) such as in digital formats following standard communication and transfer protocols such as TCP/IP protocols.

Referring now to FIG. 1, a communication system 100 of an embodiment of the invention is illustrated for allowing short-range enabled wireless device users to communicate over the Internet (or other digital communication networks) 104. The associated numbers refer to the various components of a simplified block diagram of the voice or other chat such as is enabled/provided among Bluetooth-enabled cell phone users (with Bluetooth just being one example of an implementation of the invention).

To manage the essential functionalities of each Bluetooth cell 112, a server 114 is provided that generally is a computing device or a unit of computer that offers a suite of services that may be consumed by one or more requestors, which may be user devices 116 or in turn may be another server 114 of the system 100. Utilizing some Bluetooth resources (e.g., among other components, a set of Bluetooth transceivers) to relay the communication data (e.g., login/registration and chat data) from a user device 116, the discovery messages from the servers 114, and the proximity marketing/distribution contents, a server 114 manages the connections of a Bluetooth cell phone 116 to the communication system 100 of FIG. 1. A server 114 serves as the main entry point for a cell phone user to gain access to the system or register for access as a new user. In the case of a new user registering for access to the system, the server 114 becomes a responsible server. At the time of registering a new user, an additional stage of verifying the authenticity of the server 114 may be required so that the illegal or unauthorized access by unknown servers can be prevented or controlled. Once the registration of new users is complete, a responsible server 114 functions as a normal server serving/supporting voice and other communication by the cell phone or other user device 116 over the Internet or other digital communication networks 104 to other users via their devices 116 or 124 in a cell 122 in a remote zone 120.

A Bluetooth or other communication cell 112 is an area of coverage by Bluetooth radio in which other Bluetooth-enabled devices 116 may be discovered by a managing server 114. It may span an area of a radius between a few centimeters to a few hundred meters, depending on the physical size of the premises or the enterprises in which the cells are located and the power/configuration of the server 114. A cell 112 is located within a zone 110, which may house more than one cell 112, depending on the requirements and the scope of the coverage by Bluetooth radio. A cell phone 116 may be a standard unit of mobile communication device enabled for Bluetooth communication, and in some embodiments, it may be fabricated based on specifications and with resources more scaled down and limited compared to smart phones or personal digital assistants or the like, which may be much more feature-rich and resources-rich (e.g., devices specially configured for more direct use of VoIP communication).

A zone 110 is a physical area within a premise or an enterprise in which one or more cells 112 may exist, providing an area of coverage by Bluetooth radio. Integrated with the Internet 104, a zone 110 may be connected to the global network of computers via the use of third party Internet connectivity services. Through such connectivity, the servers 114 within a zone 110 may connect to the other zones such as zone 120 via the intermediate medium of connectivity, which may in turn be a web of inter-connected networks of computers shown in part by Internet 104. One or more firewalls 105 may be provided, and may be implemented as a unit of service including software and/or hardware peripherals that collectively serve to manage the inflow and the outflow of traffic data to and from the servers 114 from a zone 110 with security support features that enhance the integrity of the transmitted data (e.g., communication between users and between the system controlling/managing devices and the users). The firewalls 105 enhance the overall security of the communication for the users of the system 100.

A router and/or switch assembly or device 106 may be provided in the communication system to serve as a gateway of the data transmitted or traffic to and from the global Internet 104. Within a zone 110 of the servers 114 of the system 100, router and switch 106 internally route the traffic data so that the servers 114 within the respective zones 110 may be able to communicate with one another and with other zones 120, 130. The Internet 104 is the global network of computers, inter-connected via the networks that transmit the data using the Internet Protocol.

Figure 2:
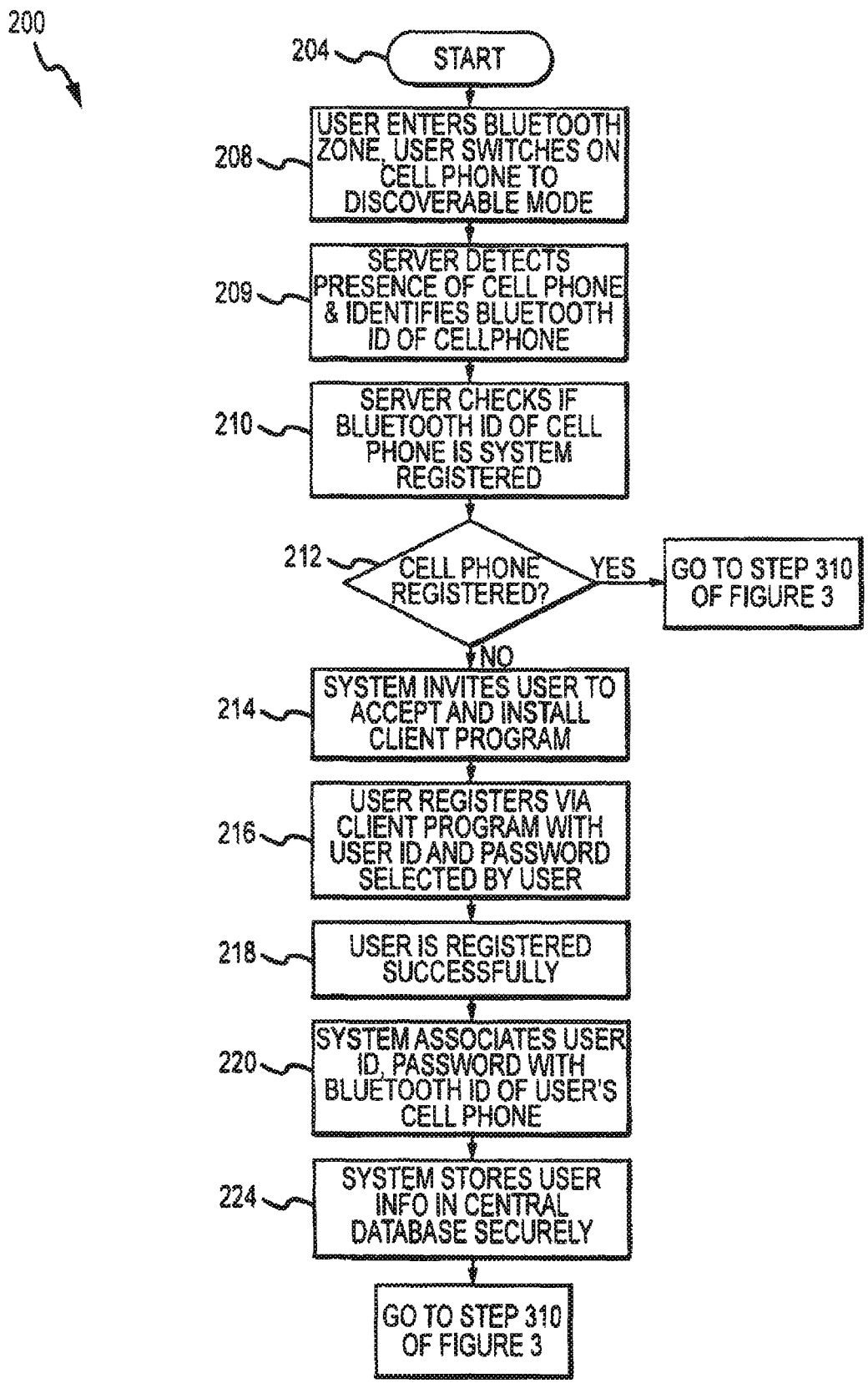
FIGS. 2 and 3 are flow diagrams illustrating a communication method of the invention such as may be performed during operation of the communication system of FIG. 1.
Figure 3:
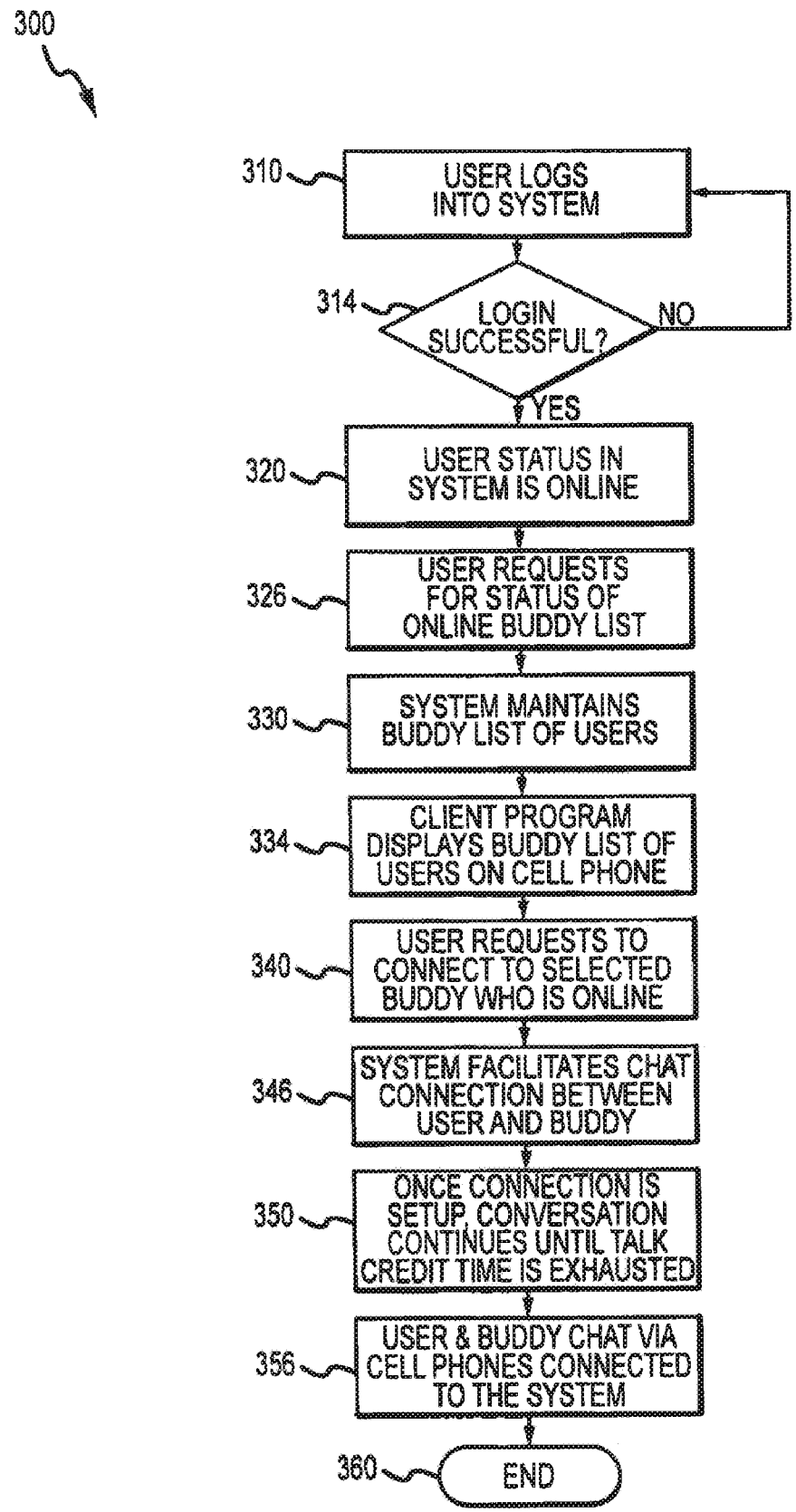

Referring now to FIGS. 2 and 3, the associated numbers refer to the flow chart on the initial sequence or process 200 of processing users accessing the system (e.g., the system 100 of FIG. 1 or another communication system of the invention) with FIG. 3 illustrating a communication system 300 for providing registered users with communication links over the Internet or other digital communication network with use of their short range communication devices (e.g., a Bluetooth-enabled or similar cell phone or electronic device). The method 200 starts at 204 such as with establishing or providing the cell servers and login servers adapted as described herein to discover user devices in a cell of a zone, to manage registration of users/user devices, to award, track/update, and otherwise manage talk credit time of users, and to establish/manage communication links between two "buddies" or contacts within the communication system.

At step 208, in a zone that is serviced by the system, there are a number of cells each being managed by a server (e.g., cells 112 are each managed by a server 114 in system 100 of FIG. 1) that manages a set of transceivers with its controlling software management modules. Regularly or periodically, the server scans around its proximity to search for any Bluetooth-enabled, discoverable devices such as cell phones. At some point, when a Bluetooth-enabled cell phone is made discoverable by its user, the server is able to detect it through its Bluetooth radio components. If a user device has its Bluetooth component(s)/chip switched off or made hidden, then it is no longer discoverable by any of the servers. At step 209, when a user switches on his Bluetooth-enabled cell phone and makes it discoverable in a cell that is managed by a server of the system, the cell phone is detected by the server through Bluetooth radio at some point in time.

In the process of discovering a cell phone, the responsible server is able to identify the 6-byte hexadecimal Bluetooth ID (or other unique device identifier), which is unique universally. Once the Bluetooth ID is identified, it is made available for use by the login components of the system if the user decides to access the system for communication services. At step 210, when a user decides to access to the system such as by making sure that the Bluetooth-enabled cell phone is made discoverable, the user starts a software program from his cell phone in order to initiate the main process of logging into the system (e.g., one or more software module is downloaded or provided on the user device and run or initiated by the user such as by pressing a button or selection on a touchscreen or keypad or by entering a voice command or the like while in some embodiments the user device communication module is activated at discovery by the server and the user responds to a prompt on a screen/user interface to accept or decline registration/login to the communication system). Once the 6-byte hexadecimal Bluetooth ID is identified/determined by the discovering server, the system (or the server) checks if the Bluetooth of the cell phone belongs to a registered user of the system against its database (not shown in FIG. 1). Such database may be distributed throughout the system in order to maximize the service availability of the main login module such as by providing it or a portion at each server (e.g., servers 114 in the system 100 of FIG. 1) and/or providing the user profile or user accounts database or memory structure at one or more data storage devices accessible by the servers (e.g., a data structure typically would be made available over the Internet 104 to servers 114 of system 100 and it may be managed by a login server not shown in FIG. 1 but described in detail below).

In the case of a registered Bluetooth ID as determined at step 212 (such as by communication between a server 114 and a login server managing user profiles for registered users), the user may proceed with the rest of the login process from the software program from his cell phone as shown in FIG. 3. In the case of an unknown Bluetooth ID as determined at step 212, the communication method continues at step 214 with initial user registration into the communication system. Throughout the zones covered by the system, there may exist ample signage and instructional displays to highlight to the passing-by crowd or the potential users of the system of the availability of the system. For example, a retail store or mall may display that free voice or other chatting is available to owners of Bluetooth or other short-range enabled devices on their premises or within a defined area/zone within the store or mall. In cases where users are interested in taking advantage of the services of the system, they are able to receive a software program that is integrated with the supporting functions that help the users to maximize their user experience in making voice chats directly from their cell phones or other user devices. The software program is installed on the cell phones of the users, and it may be known as the client software program or user device communication module or the like.

At some part of the zone responsible in servicing the interested users, there exists some server that is responsible in sending out the software program to the respective users (or each server may be so configured to send out the client software). The software program is sent wirelessly to the cell phones of the interested users via Bluetooth radio if and only if the system receives affirmative permissions from the users (note, in some embodiments, the software may be loaded in other manners such as wired/cabled connection to the server, the Internet, or the like or by stopping by a service center or desk to have the service provider modify the configuration of the user device including loading the software and/or verifying proper operation of the user device within a zone or the like). In some embodiments, the cell phone client software may be loaded into the cell phone without affirmation to optionally enhance connect time. Once the interested users receive the software program, they will need to install the software program in their cell phones, which may be achieved in some embodiments with very minimal or no user intervention. The whole cycle of installing the software program is part of the service chain of maximizing the user experience of the system. Hence, most of the settings to realize the objective of maximizing the user experience of the system are classed default but there is typically ample room for personal customization at the discretion of the users later on such as by updating their profiles to change their usernames, passwords, or other profile information (such as contact lists, ongoing consents—which may differ amongst zones such as a user wishing to accept proximity media contents at a mall but not at a sporting event or the like or may differ based on types of proximity marketing such as allowing a user to consent to accepting marketing on retail merchandise but not on financial or health services or the like).

At step 216, once the cell phone client software program is installed on a cell phone, provided that the user has made the Bluetooth-enabled cell phone discoverable within a cell of the system, the client program of the cell phone functions to guide the user in setting up the cell phone when the client software program is activated (e.g., to define his user profile and its data fields). In order to access the system, the user must be a registered user. A server from the responsible zone is able to identify the 6-byte hexadecimal Bluetooth ID (or other identifier) of the cell phone of the interested user. With the help of the client program installed in the cell phone, the user is able to select a user ID and a password, which will be used for subsequent logins to the system. At step 218, as each user is uniquely identifiable in the system, each selected user ID is searched in the login database in order to ensure the uniqueness of the user ID. Hence, there shall be no duplicated user ID in the system. Besides a user ID, each user typically is requested to choose an acceptable password associated with the user ID. Such a password may be stored in the profile or login database, and to provide further security the password may be stored not in its original form but in a form of hash, so as to enhance its security for storage purposes.

At 220, if a password and a user ID are determined to be acceptable by the system (e.g., by software running on each server or on one or more central control servers or computer systems), a user account is created in relation to the 6-byte hexadecimal Bluetooth ID of the registered cell phone (in other embodiments, a user may have more than one user device and a user profile may be provided for each device or the device IDs may be used to access a single profile formed in relation to the username or other user identifier). As a user access is typically tied to the 6-byte hexadecimal Bluetooth ID of the cell phone of the user, in some embodiments, a registered user is allowed access to the system only if the user knows the user ID and the password in the presence of the registered cell phone. In the event that a user attempts to log into the system without the registered cell phone, such an access will be denied even though the user is a registered user of the system. In other embodiments, the user is allowed to access the system with other user devices that are running the proper client software once he enters his previously stored username/ID and password (e.g., such embodiments may be useful where the account profiles are username/ID specific rather than device specific and may be useful to allow more users to access the communication system and, as a result, receive more media contents and/or remain in zones near advertisers' stores/facilities).

At step 224, once a user account is created, the access credentials are securely stored in the database distributed throughout the system (e.g., at the one or more copies of the user profile database or account data structure). Features of redundancy may be added to various components of the system so as to enhance the service availability of the access control module of the system. While a server may be responsible in registering a new user to the system, once the registration of the user access is complete, the responsible server may no longer serve as the only channel of access by the user to the system. The very same user may choose to access the system from either the responsible server or any other server of any zone of the system. In other embodiments, a user may only access zones or access cells within a zone if or when he has affirmatively agreed to receive a particular content (e.g., proximity marketing of a store providing the service) while in other embodiments access is granted more freely/openly with a user being encouraged to accept media contents to increase his free talk credit time. In the latter case, the service provider may vary the amount of free talk credit time based upon the particular content that is consented to by the user. For example, the communication system may add more time or minutes for differing contents, which may make certain contents more attractive to the user and allow the operator of the communication system to vary the amount of fees it charges the advertisers or content providers (e.g., a user may prefer to receive only short text messages but be more willing to receive video if more free talk credit time is added to his account for video or he prefers to receive only certain products/information but may be willing to receive new product information if it is associated with more free talk credit time than their media contents).

Referring to FIG. 3 and a method 300 followed if the cell phone is a previously registered user of the communication system as determined at look up/verification step 212 or after step 224 is completed, the associated numbers refer to the subsequent sequence of events leading to users making a voice or other chat. At step 310, inside a cell within a zone of the system, a registered user who intends to access the system activates the client software program from the cell phone of the user. Initializing the login access to the system, the user switches on the Bluetooth radio of his cell phone and makes it discoverable so that the Bluetooth discovery service module of the responsible server is able to identify its unique 6-byte hexadecimal Bluetooth ID. Upon submitting a login request, the client software program exchanges a number of transactional tokens with the access control module of the responsible server. Once a token of encryption based on, among other parameters, the unique 6-byte hexadecimal Bluetooth ID of the cell phone, is created and accepted by both the client software program and the access control module of the server, the subsequent exchanges of messages for the current session of login initialization may, in some embodiments, be securely encrypted to minimize message eavesdropping by unwanted parties. In some preferred embodiments, each session of login initialization creates and uses different tokens of encryption to control the hijack of the security tokens of communication.

When the client software program submits the login credentials together with the unique 6-byte hexadecimal Bluetooth ID, the access control module of the responsible server verifies the credentials with the main login module of the system. Conditional on the affirmative presence of the registered cell phone by the responsible server locally, e.g., the cell phone is discoverable via the Bluetooth radio and its 6-byte hexadecimal Bluetooth ID identified by the discovery service module of the responsible server, the login credentials will be challenged and verified against the main login module of the system (which may be provided in a control or system management server or computer system linked to the servers of the zones of system 100 but not shown in FIG. 1). While the user IDs may be stored in their raw format in the main set of the login databases, the passwords may be stored via their respective hashes, secured by, among other parameters, their respective 6-byte hexadecimal Bluetooth IDs of their cell phones. Unless there is evidence to the contrary, all user logins are considered invalid, minimizing unauthorized user access where appropriate.

Once a user successfully logs into the system as determined or verified at step 314, the status of the user in the system is appropriately reflected at step 320 within the system such as in a data field of the user profile or account record (e.g., "User Status"). In general, users are able to customize their status at will, thereby customizing their readiness to be reached by the other users of the system. By default, the initial status of the users after they have successfully logged into the system is online. At step 326, at any time after a user has successfully logged into the system, the user is able to build a list of contacts he wishes to touch base or to access a previously built list stored as part of their user profile or separately. Reflective of the willingness or unwillingness to be contacted by other users, the system manages the required authorization procedure from the parties concerned such that unless an approval has been granted explicitly by the targeted party to a user, the user is not allowed to reach the targeted party. In some embodiments, the permission has to be specific to another user such as by their username while in other embodiments the users may simply state they are accessible/open to receiving messages/communications from other users. When a targeted party has been informed by the system (e.g., by communication control/management software or modules running on the system) of a request to be touched base or contacted by another user of the system, the targeted party may opt to accept or decline the request at will. The requesting user will be appropriately informed of the decision of the targeted party.

When a login is successful, the client software program in the cell phone of the user requests the buddy contact list of the user. As the contacts of the user are managed by the contact management module of the system, a list of the available contacts together with the associated status of availability of the contacts can be compiled at the instant of request and the status of the users in the contact list may be displayed to the user (e.g., user online, user offline, user busy, and so on). At step 330 and over time, a user builds a list of contacts he wishes to touch base with regularly. In each session of access to the system, the user may attempt to reach the contacts, provided the remote contacts are online and willing to be contacted. As a remote contact is added to the contact list of a user, the related details like the user ID of the remote contact and the transaction timestamp are recorded by the contact management module of the system securely. A contact management module of the system may be provided to manage the contact list and to simplify the management of contacts by the users via the client software program from the cell phones. In some embodiments, a user is allowed to add users to his buddy or contact list in a variety of ways such as by manually typing in their names or their user IDs (which they share with one another) and having the contact management module verify the added user is a properly registered user (if not, the module may prompt the user to encourage their friends/contacts to join such as by awarding point/talk credits or time for adding previously unregistered people to his list). In other cases, the user may be able to enter search terms to look for his friends without prior knowledge of his contacts' user IDs.

At step 334, once a contact list is made available to the client program of the cell phone, the contact list is then displayed on the cell phone so that the user may choose to initiate conversation with a contact currently online and willing to be contacted. A user browses a list of the available contacts via the client software program from his cell phone such as by operating a keypad or touchscreen to view the list and/or a voice activated command. When the user wishes to touch base with a contact of his choice, he can initiate at 340 a conversation request directly from his cell phone (again by making a selection by keypad/touchscreen, mouse, voice command, or other I/O technique). The request of a conversation is then relayed to the targeted remote contact (e.g., a request from a device 116 in a cell 112 of a first zone 110 may have his request for conversation/chat forwarded via servers 114 124 to a device 126 associated or used by one of his contacts/buddies in a different cell 122 in a remote zone 120 (or, in some cases, a device 116 within zone 110 and even within the same cell 112)).

At step 346, as users may connect or disconnect from the system at will, the actual status of availability for conversation is typically determined during the moment of the request of a conversation. As each user connects to the system via a cell, the point of connection can be determined precisely, as each cell of the system is uniquely identified together with its responsible zone of the system. The initial point of access and the current point of access (e.g., a user may move from one cell to another or from one zone to another during a single connection or communication session in some embodiments while others may require a user to remain in a single cell or a single zone to avoid losing a connection to the communication system) can be determined as the information is managed by the session access management module of the system. In other words, as long as a cell phone remains discoverable by the Bluetooth discovery service module of a server within a zone of the system, the current access point of the cell phone can be determined and hence, its status of connectivity can be established. Once the status of connectivity of a targeted contact is established, the communication module of the system determines if it is appropriate to reach the targeted contact at the point in time. The communication module manages the conversation request to the targeted contact. If the targeted contact has no intent to be contacted, an appropriate status will be communicated to the initiating user. In the event that a conversation request is accepted, the client software program of the targeted contact collaborates with the communication module of the system to establish the tokens of communication, including the required security contexts to secure the channel of communication.

At step 350, once the required tokens of communication are established, the communication module of the system collaborates with the client software programs of the cell phones of the communicating parties (the initiating user and the targeted contact) to establish a connection for voice communication and/or other chat communication. At this point, the free talk credit time of the calling party is checked. If the calling party does not have any free talk credit time, the system will not proceed to initiate his call request. When the connection for voice communication or other chat session is successfully established, the communicating parties proceed to start the communication when the communication module of the system completes the conversation setup steps. As soon as the communication between the parties is established, the system starts to debit/reduce the free talk credit time of the calling party. Once communication is established, conversation between the parties may continue until a caller's talk credit time is exhausted. At step 356, the communicating parties start and proceed with their voice or other chat until terminated by either party at any time during their conversation as shown as step 360. The conversation may also be ended at 360 by the communication control module such as when the requesting party has exhausted all of the free talk credit time or a user is no longer in the range of a particular server or for other reasons.

Figure 4A:
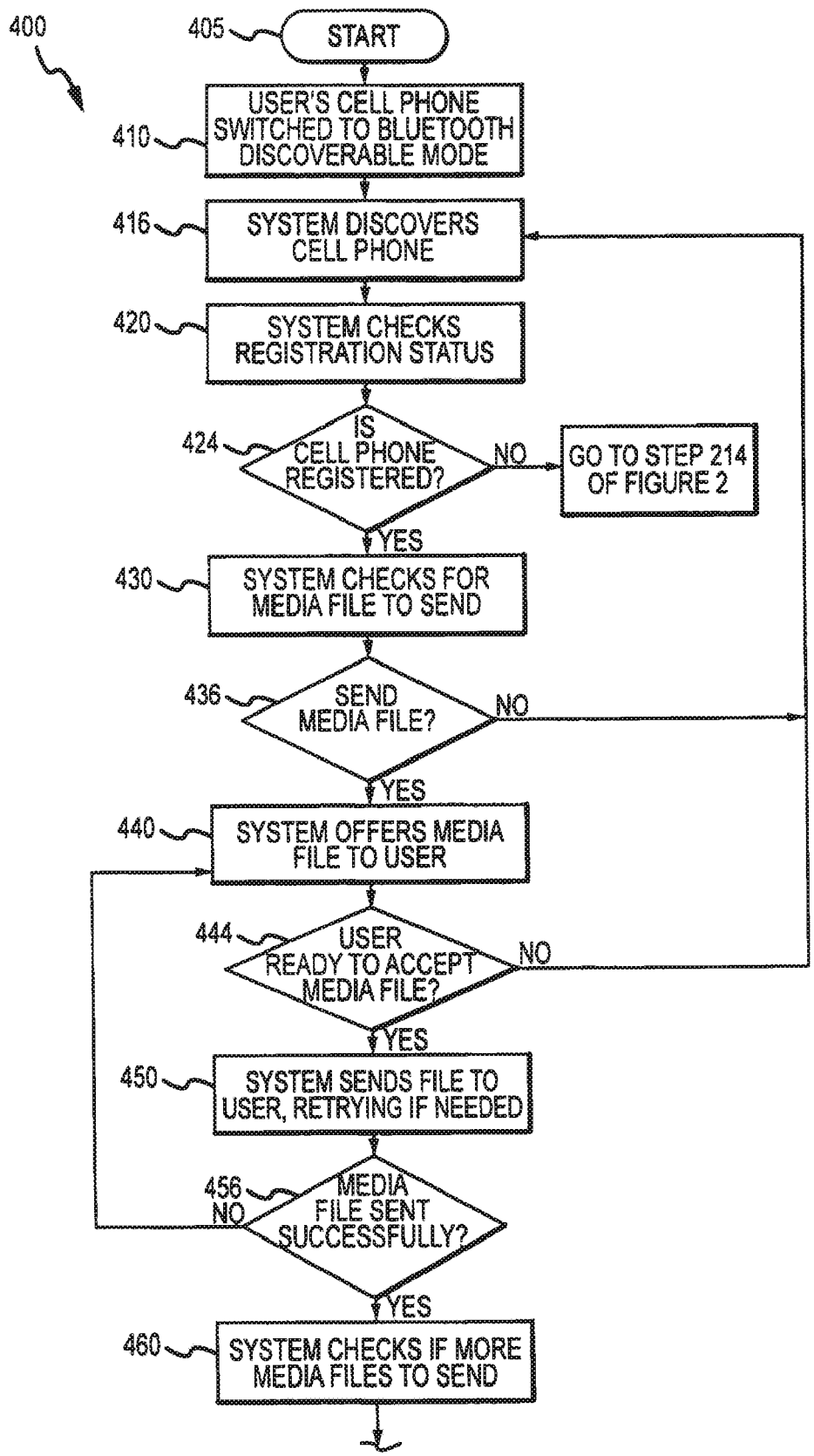
FIGS. 4A and 4B collectively depict a flow diagram illustrating a communication management method or proximity marketing/content distribution method performed according to some embodiments of the invention such as during operation of the system of FIG. 1.
Figure 4B:
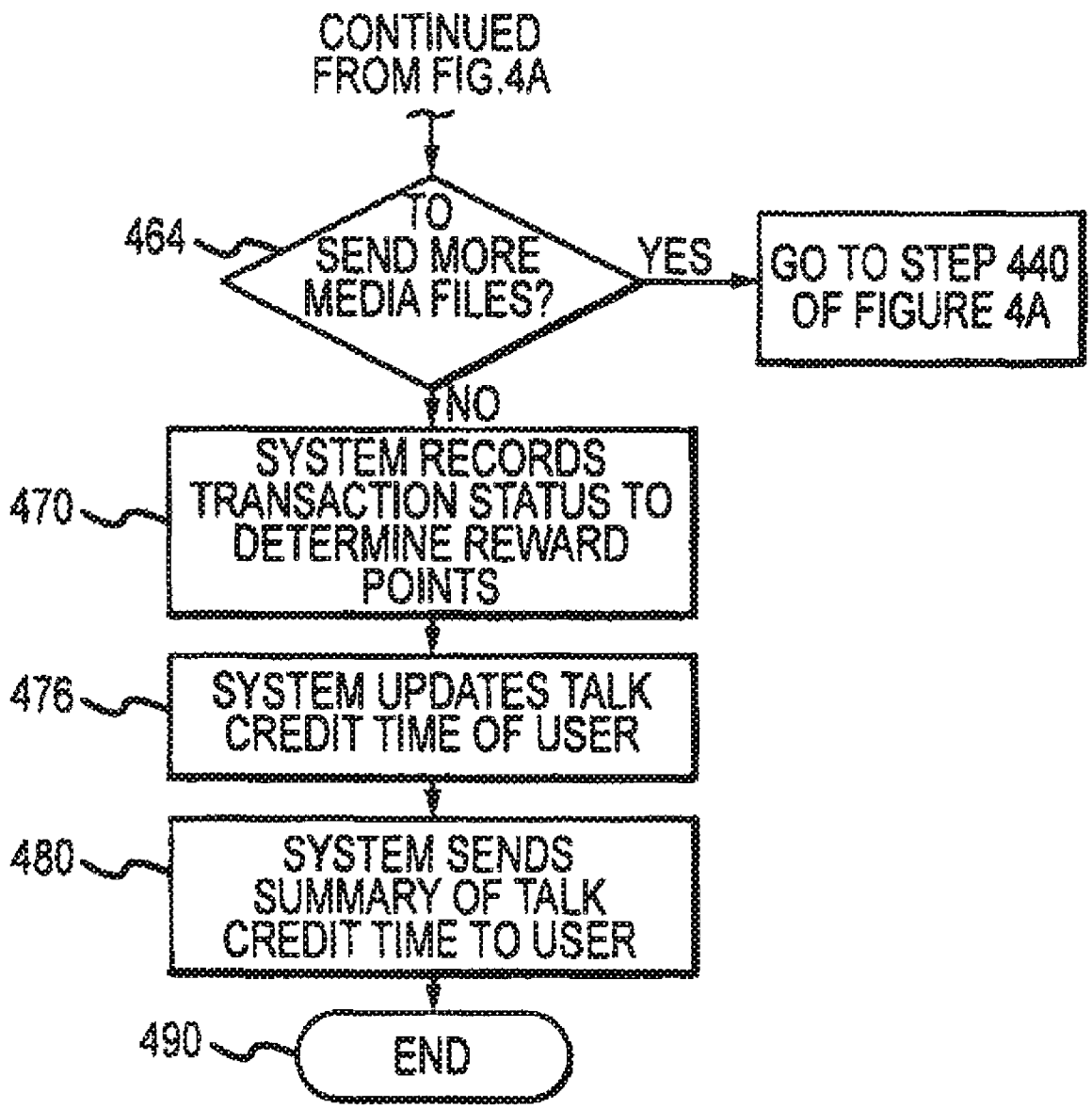

FIG. 4 illustrates a method or portion of a method for managing communication 400 within a communication system of the invention (such as the system 100 of FIG. 1). The illustrated method 400 includes steps for allocating free talk credit time such as in exchange for viewing/receiving advertising or other media contents from a communication or server and at the start/initiation step 405 the rules/guidelines for awarding talk credit time to users typically is established and saved in memory (e.g., 15 minutes for viewing a particular set of advertising or other content, 10 minutes for moving into proximity of a product display, 30 minutes for purchasing a product in response to viewed/received contents or otherwise, 1 hour for referring another registered user to the system 100, and so on).

At step 410, a user of a Bluetooth-enabled device or cell phone steps into a cell of a zone covered by the system and makes the phone/device discoverable by Bluetooth radio. At step 416, regularly or periodically, the discovery service of a server in a cell scans in its proximity to discover any Bluetooth-enabled devices, e.g. cell phones, video consoles, portable computing devices, and so on (with the description describing use of cell phones as an example (and for clarity) but not as a limitation). When such a device is made discoverable by its owner, it will be discovered by the server of the cell in which the device is found during the server's next scan for devices (e.g., a period of less than several seconds up to every 20 to 60 seconds or the like).

At step 420, once the server discovers a cell phone via Bluetooth, the 6-byte hexadecimal Bluetooth ID of the cell phone is identified or determined and checked at step 424 to determine whether it belongs to a registered user of the system (e.g., comparing the determined device ID against a database or listing of registered users or a device ID field in a set of registered users). If the determined II) does not belong to any registered user of the system, the system will invite the user of the cell phone to become a registered user of the system. The detailed process flow in which such an invitation is extended to the user is shown in FIG. 2.

At step 430, once the system confirms the registration status of the cell phone, the server checks against the media content management module to ascertain if there is any marketing campaign in progress. A marketing campaign typically contains one or more marketing media (contents) in the form of an electronic file, be it video, sound, pictures, texts, music, or the like, that may be sent to the users at step 436. If there is no media file or additional media files (or other media contents such as a default file of data relevant to the location of the cell) to be sent as determined at 436, the method 400 continues with step 416 (e.g., the user may not be offered any free talk credit time at this point in the process 400).

At step 440, when there is a file to be sent, the system attempts to over it to the user of the cell phone. A user may decline it (or not be ready to receive it such as due to status of operation of cell phone or its configuration) at 444, and the system may repeat/continue the process 400 by going back to step 416 or the process 400 may continue again at 416 when the user leaves the zone in which his cell phone is discovered (without accepting an offer to receive media contents such as a file related to a marketing campaign). When the user and/or his device is ready to accept a media file as determined at 441, the method 400 continues at step 450 with the user of the discovered device choosing to receive a marketing media file, the system will attempt to send it to the user, retrying if necessary such as when the media file is determined to have been unsuccessfully transmitted or not successfully/fully received by the user device at step 456. At step 460, depending on the scale of a marketing campaign or volume of media contents, there may be one or more media files to be sent to any participating user. If there is more than one file to be sent as determined at step 464 by a cell server, zone controller (e.g., server acting as zone controller as explained below), and/or login server (as explained in detail below), the process of sending the subsequent file(s) continues with repeating step 440 (or step 450 in some embodiments of method 400).

Once all files/contents have been transmitted to the user device, the method 400 continues at step 470 with the system recording the status of the transactions, calculating the total number of files and the number of campaigns participated by the user (or files/portions of media contents received by the user device). A number of reward points may be derived from the status of the transactions (such as "X" number of reward points for each campaign, each file received, each portion of content, or the like with the numbers differing in some cases based on the particular file/content received and/or based on the campaign as some advertisers or content providers may reward more points than others so as to drive users to their advertisements/contents). The amount of free "talk time" may also be determined by the amount and/or type of response and interaction provided by the mobile device user. For example, a certain amount of time may be awarded for just receiving marketing messages and more time for responding to messages (such as responding to a poll) and yet more if the user acts on the marketing message (e.g., buys a product or service within a defined time period such as next 24 hours). Based on the budget size, the total number of participating brand owners of the current campaigns, the total reward points received in the current session may be converted to the equivalent free talk credit time for the user (or a differing calculation may be used such as double (or some other multiplier) point values during times where advertisers want to urge users to come to a chat cell such as during an off season/shopping time or during a new product release or the like). In some embodiments, the device user may redeem his free talk credit time or points/credits for discounts or free goods/services instead of simply for talk/chat time.

At step 476, once the free talk credit time is computed, the system will update (such as with a server acting as a zone controller with communication/collaboration with a login server that may manage the user accounts/profiles) the corresponding account or profile of the user (e.g., update their profile or account record stored in a database or other file structure in a cell server, in a communication management server, or other data storage device accessible by the servers/management devices of a communication system of the invention). At step 480, once the free talk credit time of a user is updated successfully, the system will inform the user of the current record update by sending a message to the user through Bluetooth for display on the user interface or screen of the device (e.g., a text message may be displayed stating "Thank you for accepting and enjoying those advertisements. Your account has been adjusted to indicate you now have Y minutes of free talk credit time available. Please Enjoy!" or the like). The method 400 may then end at 490 or return to step 410 to repeat the process with same or differing discovered user devices.

Figure 5:
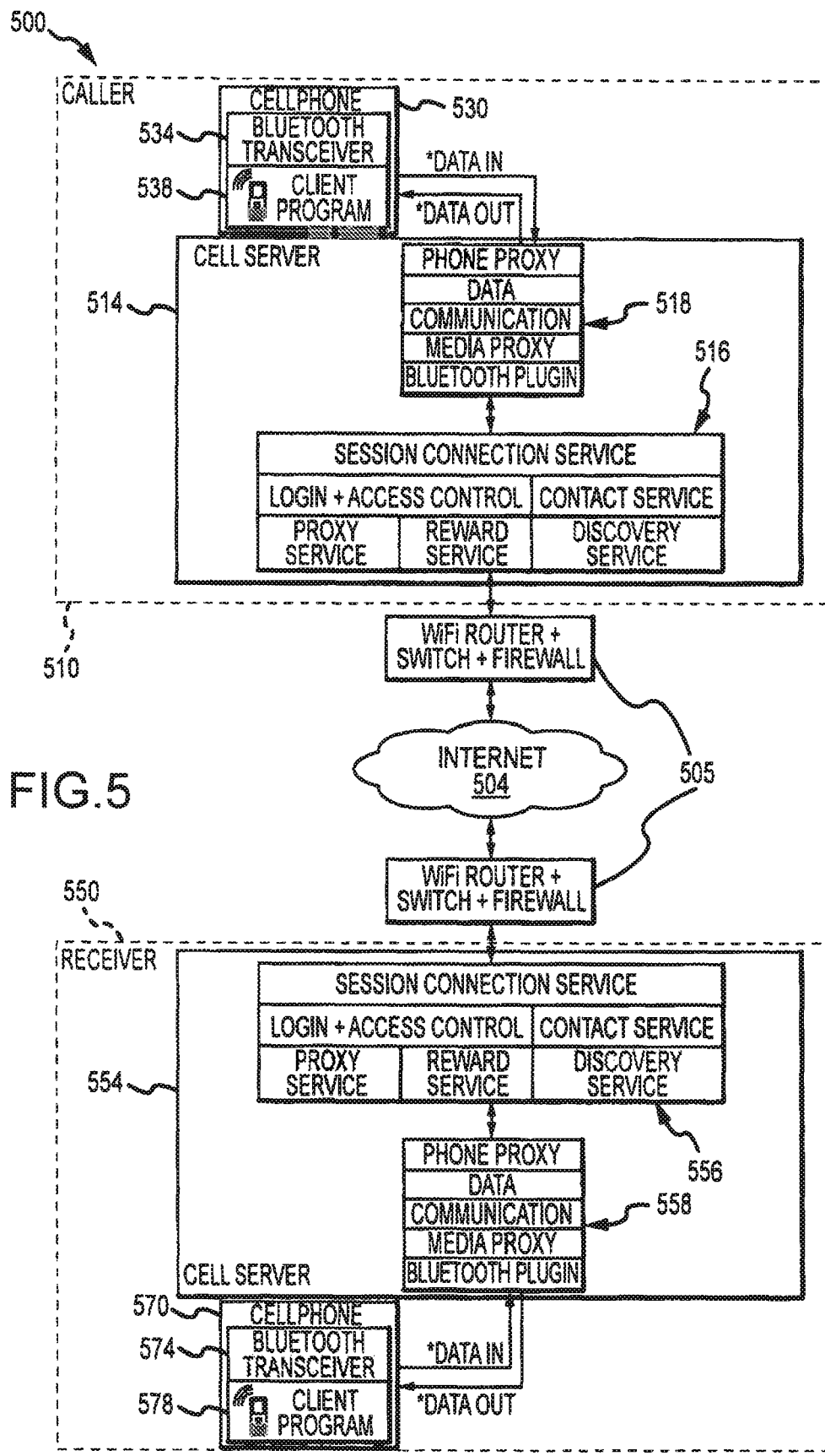
FIG. 5 illustrates in detail exemplary embodiments of the components of a communication system of the invention (such as the communication system of FIG. 1) including software modules or objects that may be provided on user devices such as cell phones and on the cell servers.

FIG. 5 provides exemplary software/hardware modules or mechanisms that may be provided or encoded into the components of a communication system to provide the communication methods and functionality of the invention (e.g., with the titles/names of the services or modules provided in the servers indicative of their functions as described herein).

When a user logs into the system, once his login is authorized, a proxy client is assigned by the system to service the user via the installed client program 538 on his cell phone (or other user device). A proxy client 518 is a pseudo replica of a cell phone, designed to run in the process space of a server 514 of the cell in which the user logs into the communication system. Collaborating with the client program 538 of the cell phone, the proxy client 518 is responsible for relaying the media and control data to and from the client program 538 of the cell phone.

The following describes functions or processes occurring when a user makes a phone call or chat session with the communication system. When a user speaks into his cell phone, the client program 538 coordinates in capturing and relaying the communication to the corresponding proxy client 518 via Bluetooth. The proxy client 518 then routes the traffic data received from the client program 538 of the cell phone via Bluetooth to its communication service. After some routine operational steps in checking the integrity of the traffic data, identifying the intended route of the data, the proxy client 518 will route the packetized traffic data via the Internet to the intended recipient using the Internet Protocol (IP). The entire channel of communication between the communicating parties is security enabled through the use of some encryption technologies.

With reference to FIG. 5, the following provides a discussion, with reference to a portion of a communication system 500 (e.g., a portion of system 100 shown in FIG. 1), of how a user (a target device) of a communication system 500 may receive a call from a requesting user. This is indicated in part by the grouping of portions of the communication system 500 into a caller or requesting user portion 510 and a receiver or target user portion 550 (which may also be thought of as a caller/requestor zone and a receiver/target/remote zone) that are linked by the Internet or other digital communication network 504 via network connection assemblies 505 (e.g., routers, switches, firewalls, and other components useful for connecting a server to the Internet or other network 504).

When the server 554 of a cell is informed of an incoming voice chat request from a remote party (e.g., a device that has been discovered by server 514, the server 554 identifies the targeted proxy client 558 through a series of verification and integrity checks of the incoming traffic data). When traffic data arrives at the targeted proxy client 558 of the cell phone 570 of the remote targeted contact, it will be subject to some routine operational steps in verifying its data integrity and some security scrutiny. Through its communication service (shown as a service or module of the phone proxy 558 provided on server 554), the proxy client 558 of the targeted contact cell phone 570 will route the traffic data from the associated Internet Protocol (IP) packets to the Bluetooth plug-in to be transported to the client program 578 of the targeted cell phone 570 via Bluetooth (e.g., transceiver and/or hardware/software to provide Bluetooth or other short-range enabling functionality to device 570). The client program 578 of the targeted cell phone 570 collaborates with its associated proxy client 558 to route the traffic data to the speaker of the cell phone of the targeted party. The cell server 554 includes/runs a set of services/modules 556 to provide the communication functions/processes as described above with reference to FIGS. 1-4 and in more detail in the following paragraphs. In this example, the requesting portion of system 500 also includes a cell server 514 with a set of modules/services 516 providing similar functionality as the service/module set 556 of target cell server 554, and the cell server 514 runs or creates a phone proxy 518 with services/modules/layers similar to the target/receiver cell server 554. Likewise, the requesting device 530 is a cell phone or other electronic device that is enabled for short range communication (e.g., with a Bluetooth transceiver 534 or the like) and includes a client program 538 run by a processor of the device 530.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, the above discussion stresses the use of cell phones as the user device, but the user device may generally be any electronic device that may be used to communicate wirelessly according to a short-range communication protocol or method. For example, the user device may be enabled to communicate up to about 100 to 300 meters or more using the Bluetooth standard and communication protocol that is designed for low power consumption based on low-cost transceiver microchip(s) provided in each user device. The devices use a radio communication system and do not have to be in line of sight of the servers of the communication system. Bluetooth-enabled devices that may be used as user devices may vary and include mobile or cell phones, laptops, personal, or other computers, video-game consoles/devices, headsets, and other portable/handheld devices (e.g., any device configured for text, voice, video, picture, and other communications such as even digital cameras, PDAs, and the like). Bluetooth devices typically are able to communicate sound/voice data as well as byte or digital data (e.g., in an object push model or in an object/data pull model at several to many megabits per second) and include a processor with an operating system (or portions of a processing stack) useful for running software including the client software discussed herein for the communication system. Typically, a Bluetooth device may transmit the following to support discovery: device name, device class, list of services on the device, technical information, and its unique ID. The discussion provides more details about Bluetooth as it is expected to be one way to implement the concepts of the invention. But, other wireless communication technologies may be used as long as the servers of the communication system are configured to search for and discover such devices and/or to communicate with these devices during registration, login processes, and during chat sessions as well as to distribute media contents.

The servers of the communication system typically are configured with software and/or hardware to be able to communicate with the user devices (e.g., are configured to communicate with the user devices via the Bluetooth protocol). Further, the servers typically are adapted to initiate and/or manage communication over a digital communication network such as the Internet between the user devices. In some embodiments, standard TCP/IP formats are utilized such as for transfer of text, video, or similar files between the devices. In many embodiments, though, the servers are also configured to support voice chat sessions between user devices. This may be achieved by configuring the servers to support VoIP or Voice over Internet Protocol, which is a protocol that is suitable for the transmission of voice through the Internet or other packet switched networks. In some cases, the communication modules may be configured as or include a VoIP module or VoIP provider module, which may be a custom software/hardware module or may be conventional VoIP software readily available from numerous distributors.

The above description discusses a method of connecting many Bluetooth-enabled cell phones together via a series of inter-connected networks of servers. In some embodiments of this communication method, each network of servers may include a number of inter-connected servers, which may be known as a cell of servers. The described communication technique may also be thought of as a method of connecting multiple cells of servers, each covering a finite area of service, which collectively connects other IP networks of cells of servers.

The communication methods and systems of the present invention provide a number of features/functions and/or advantages. For example, each cell of server may contribute a number of connections to a pool to which the cell phones may connect via Bluetooth radio. Each zone of cells is inter-connected with other zones of cells via IP network into forming a larger inter-connected network of cells of servers. Each user may communicate via his Bluetooth-enabled cell phone with a remote user of a connected cell phone (or another user within his current cell). Each user may connect to any one of the cells of servers via Bluetooth radio at certain locations (e.g., proximity marketing cells), thereby drawing public traffic to the associated locations. The cell phones may connect to the inter-connected network of servers via the Bluetooth technologies. Each zone of servers may be located in different geographic locations. Each server may collaborate with fellow servers so as to maximize the quality of the service connections with the cell phones. Each server may be configured to be responsible/function to detect and avail resources for connections by users of the cell phones. Each server may function to detect the presence of the Bluetooth-enabled cell phones in its proximity. Each server may check if a cell phone's presence is registered based on its unique 6-byte hexadecimal Bluetooth ID. Each server may invite the user of a detected cell phone to be registered as a user of the system. Each server may dispatch a program (client program run by a processor on the user device) to the cell phone to enable and affect the registration smoothly with the consent of the user. User information may be associated with the unique 6-byte hexadecimal Bluetooth ID. The association of the information of a registered user will be stored securely in duplicate in some remote servers.

Figure 6:
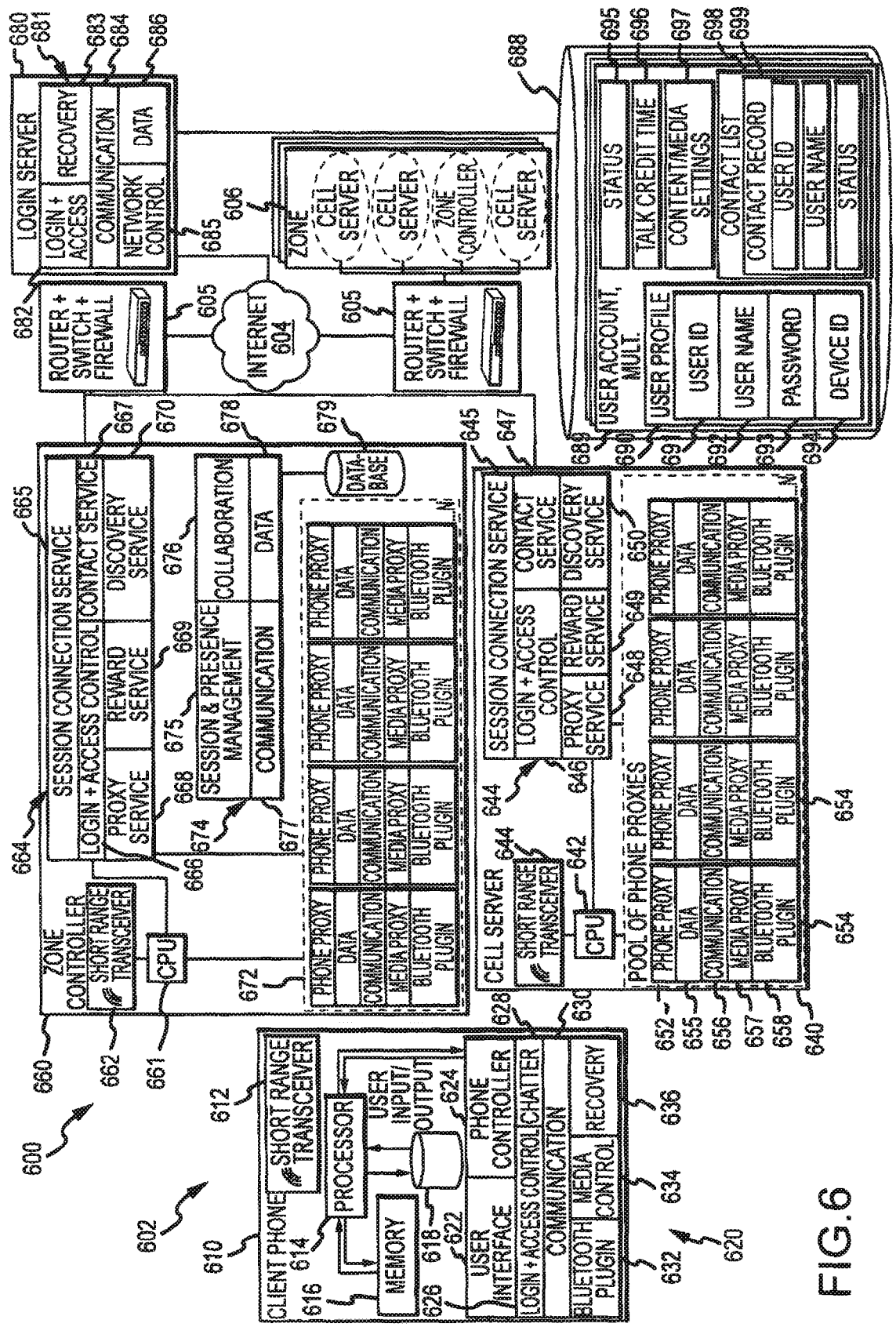
FIG. 6 illustrates in block diagram form a communication system of an embodiment of the invention providing additional details about modules or services that may be run or provided on the client devices and system servers (or similar computer/electronic devices) to provide desired communication management and communication between two short range-enabled devices over the Internet.

With the above description of aspects of the invention in mind, it may now be useful to provide further detail of particular configurations of user devices and communication system servers including software, firmware, and/or hardware module or service used to provide the functionalities described herein (e.g., such as the methods shown in FIGS. 2-4) (see, for example, FIG. 6). Additionally, descriptions of exemplary, but not limiting, screenshots that may be generated by the user interface module of the client software program are provided to assist the reader in understanding the communication management processes provided by the present invention (see, for example, FIGS. 7A-7L). Yet further, processes carried out during operation of the communication system are described in more detail to explain the configuration or design of the various software, firmware, and/or hardware used in the client device and system servers of the inventive communication system (e.g., system 100 of FIG. 1 and other systems described herein) (see, for example, FIGS. 8-10).

FIG. 6 illustrates a communication system 600 according to an embodiment of the invention with components of a representative zone 602 shown in detail. Specifically, within the zone 602, there may be one or more servers or cell servers 640, 660 that are each configured to serve a plurality of client or user devices 610 (e.g., cell phones or the like enabled for short-range communication). The servers 640, 660 are used by the client device 610 to communicate with other user communication devices (e.g., other short-range enabled devices such as Bluetooth cell phones or the like) located in other zones 606 (which may each have a number of cells served by cell servers and at least one zone server as shown) via network connection devices 605 and over a digital communication network 604 such as the Internet or the like.

Each user device (or cell phone as shown) 610 generally includes a short range transceiver 612 along with a processor 614. The processor 614 controls operation and use of memory 616 and processing of user input and output 618. The processor 614 also runs client software program 620 when it is downloaded and run as part of operation of the system 600 to allow the user to operate his device 610 to communicate via a server 640 or 650 with devices within the same zone 602 or in other zones 606. The client software program 620 is shown to include a number of services or modules (i.e., a user interface module 622, a phone controller 624, a login and access control module 626, a chatter management module 628, a communication module or layer 630, a Bluetooth plug in 632, a media control module 634, and a recover module 636) whose functions will be evident from their names and/or are discussed in further detail below (e.g., with reference to FIGS. 7A-10).

In each zone (such as zone 602 or the zones 606 with a zone generally being any space or area covered/serviced by one or more cell servers of the system), there may be one or more cells that each houses or contains a cell server similar in configuration as server 640. Each cell server 640 may include a CPU/processor 642 controlling operation of server memory and a short-range transceiver 644 that communicates wirelessly in the area of the cell with client devices 610. The CPU 642 also runs a set of cell management modules 644 including a session connection service 645, a login and access control module 646, a contact service 647, a proxy service 648, a reward service 649, and a discovery service 650. During operation of the system 600, the cell server 640 may use its proxy service 648 to create a pool 652 of phone proxies 654 that are each associated with a client phone 610 and may include modules or services themselves such as a data module 655, a communication module 656, a media proxy 657, and a Bluetooth plug in 658.

Among the two or more cell servers in a zone 602, one or more servers may be designated as a zone controller as shown for server 660. The zone controller 660 may provide similar functionalities as a cell server (e.g., act also as a cell server) and include a CPU 661 managing a short range transceiver 662 as well as a set of cell server services (e.g., a session connection service 665, a login and access control module 666, a contact service 667, a proxy service 668, a reward service 669, and a discovery service 670) to create pool 672 of phone or device proxies. Further, the zone controller 660 has additional functionalities to help manage the presence of the registered users within a zone, and a set of services/modules 674 (such as a session and presence management module 675, a collaboration module 676, a communication module 677, and a data service 678) along with a zone controller database 679 may be provided or run on the zone controller 660. The main functions of the zone controller 660 are to manage the presence and identify the location details of online users (e.g., users of client phones or other devices 610) in the context of a zone such as zone 602. As it may become a bottleneck with the zone 602, a zone controller 660 may be housed on a more predictably stable platform so that its service availability can be maximized/optimized.

Within the zone 602, the zone controller 660 keeps track of the presence of an online user (e.g., with the session and presence management module 675). For example, after a user has operated (such as with client software program 620) their cell phone 610 to successfully log in to the system 600, a phone proxy will have been assigned to a client program of a cell phone of the online user (e.g., a phone proxy 654 will be assigned by proxy service 648 to the client program 620 of the cell phone 610). Throughout the session of establishing a connection with the client device 610, the zone controller 660 is responding to the channel the connection request between a connecting client program 620 of a cell phone 610 and a login server 680. Operation of the login server 680 is achieved via a set of services/modules 681 such as a login and access module 682, a recovery module 683, a communication module 684, a network control module 685, and a data module 686.

During operation of system 600, the login server 680 may access a data structure 688 including a plurality of user account files or records 689 that include user profiles 690 for each user/user device and may include data or fields regarding a user ID 691, a user name 692, a password 693, and a device ID 694. The user account 689 may also be used to store the status 695 of the user (or device 610) such as online, offline, not accepting calls (in general and/or from particular registered users), and so on. The user account 689 may also be used by the login server 680 to store the talk credit time 696 the user has accumulated or been awarded. Further, the user account 689 may store content/media settings 697 such as data indicating whether the user has agreed to receive particular types of contents from the system 600 (e.g., particular media file formats, particular advertising contents/forms, and so on) and/or to receive contents from particular distributors/owners of contents/media and whether the user has requested that contents of a particular type/source not be transmitted to his device 610. Additionally, the user account 689 may include a contact list 698 with a record for each of the user's contacts or buddies (e.g., showing their user ID, user name, and present status regarding the system 600) or a link to the contact list may be stored in the user account 689 with a different file or data structure 688 used to store the contact lists of the system 600.

Once a connection session is successfully set up, the zone controller 660 keeps a connection address of the phone proxy 654 or in pool 672 that it will share with a legitimate cell server or other requestor zone controllers from other zones geographically (e.g., zone controller in zone 606). The phone proxies such as proxies 654 are managed by the proxy service 648 of the cell server 640 responsible in connection with the client program 620 of the cell phone 610 of the connected user. A phone proxy 654 is generally a pseudo device of the client program 620 residing at the connecting cell server 640. As a registered device 610 may have limited resources, a phone proxy 654 residing at a cell server 640 generally performs most of the tasks of communicating with a remote party (e.g., a device in a remote zone 606 or even within the zone 602 as the system 600 may be used to link any two registered and available/online users within reach/service distance of a cell server). For example, voice captured at the microphone of the cell phone 610 is relayed to the associated phone proxy 654 to be transported to the remote receiver or target party/device. On the receiving end, the voice data received by the remote phone proxy will be relayed to the speakers of the cell phone of the remote receiver or target device.

Figure 7A:
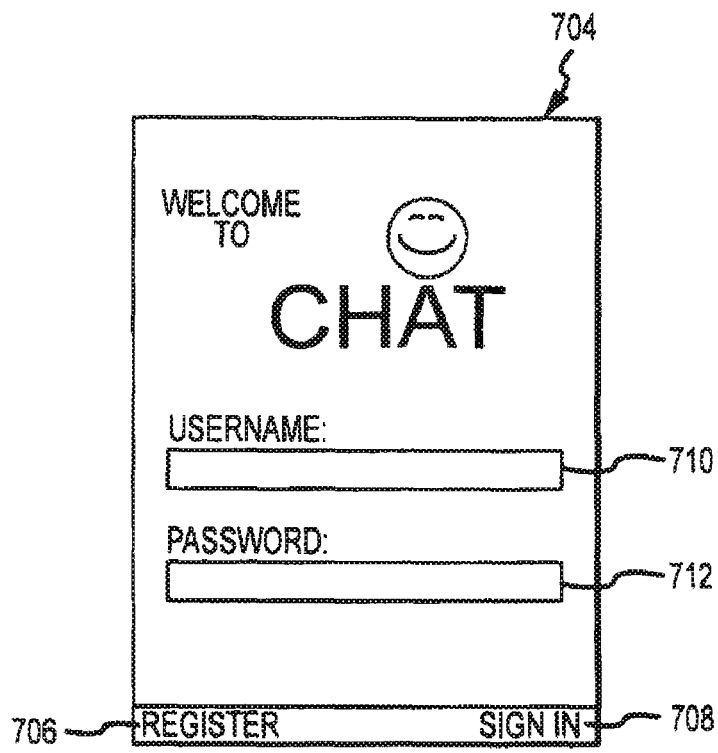
FIGS. 7A-7L are exemplary screenshots of user interfaces provided by a client program during operation of a communication system of the invention.

FIGS. 7A-7L illustrate screenshots (in black and white with it being understood that images typically will be generated in color when supported by the user device) that may be generated on a monitor or display screen of the phone or device 610 by the client program 620 during operation of the system 600 such as generated by the user interface 622 and allowing a client phone 610 to provide input and output 618 to a user of the device 610. FIG. 7A illustrates a main login screen 704 of the client program 620 that is configured to provide a graphical user interface that facilitates user input and also to display messages from system 600 (e.g., from login server 680 and/or zone controller 660) during a communication session. As shown, the screen or display 704 includes a register button 706 (with "button" used to mean any data input/selection device used in user interfaces/screens) and a sign in button 708. The screen 704 also includes a user name data box 710 and a password data box 712. A registered user of a system 600 may use the screen 704 to input (e.g., with a keypad, a touch screen, voice recognition services, and the like) his user name in box 710 (and/or user ID in some embodiments) as well as his chosen password in box 712 to be sent to the system 600, such as to login server 680, for verification. The sign in button 708 may be selected to attempt to log in to the system 600. If the user is a new or unregistered user, the user may select the register button 706 to attempt to create a user account 689 with the system 600 for subsequent accesses (e.g., providing user name, user ID, device ID (which may be detected by a cell server 640 of the system 600 in most cases), and/or other information such as demographic data which may be encouraged by awarding of additional talk credit time (e.g., a user who agrees to provide his mailing address may get a set amount of awarded time while a user who provides his age, sex, and/or other information may receive another set amount of time) that may be stored in his user account 689 as shown at 696 (and, of course, the user may be awarded an initial amount of time simply for registering as a new user).

Figure 7B:
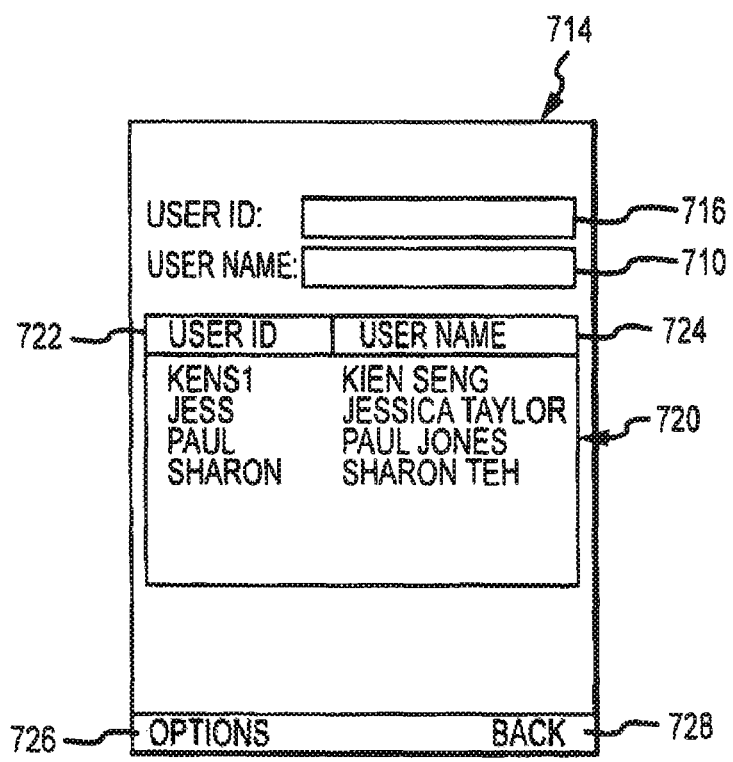

FIG. 7B illustrates a screen or display 714 that may be presented by the client program 620 on a client device 610 during operation of the system 600. The display 714 includes a user name data box 710 as well as a user ED data box 716. The display 714 further shows a contact or buddy list 720 of the user of the device 610 listing contacts/buddies with a user ID column 722 and a user name column 724. The display 714 also includes an options button 726 that may be selected to take particular actions regarding the buddy list 720 (or otherwise as allowed by the client program 620) and a back navigation button 728 that may be selected to return to a previous screen/display. The screen 714 may be used to display and/or initiate a request by the user of cell phone or other device 620 for his current contact or buddy list 720 and then to seek permission of a remote party to add that target or receiving party to the user's buddy/contact list 720. En some embodiments, each user must grant explicit permission to be on a user's contact list 720 before he can be contacted by another user of the system 600, and in some cases, both parties' contact lists are concurrently updated upon such a grant of permission (e.g., if I request permission from "Bobby" to have his name on my contact list, I am granting the system permission to add my name to Bobby's contact list, too, such that when Bobby grants permission his contact list is updated to include my name/information).

Figure 7C:
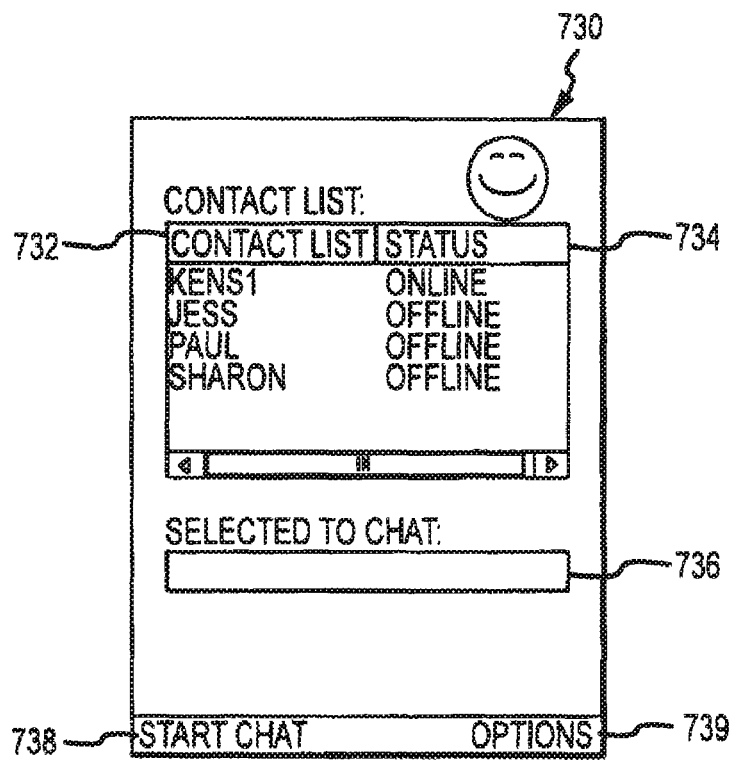

FIG. 7C illustrates a display or screen 730 on a user's device 610 that shows a contact list 732 by user ID and their present status 734. A box 736 is provided to allow a user to request communication or chat be established with a user from the list 732 such as by selecting a start chat button 738. An option button 739 may be provided to access other functionality of the client program 620 (e.g., to manage those on the list 732). The displayed list 732 shows only the contacts or buddies that have agreed to communicate with the user. Each contact typically will have responded positively to a permission request before they are added to the list 732. The user is allowed to enter data in the display 730 so as to communicate with those on his contact list 732, but such a connection is typically only attempted or allowed when the other user is online or currently connected (e.g., a user of the client program that is registered with the system 600 and actively using the communication system 600) to the system 600 at the time a communication request is initiated via the user interface screen 730 (e.g., his status 734 is "online" and not offline or busy (e.g., online but already communicating or not in online and receiving mode). To this end, the system 600 preferably operates to determine the status of users on a contact list at least periodically such as when the user requests to view his contact list (e.g., creation of screen 730), when the start chat button 738 is chosen (e.g., when the communication session initiation request is transmitted/initiated), when the user's name is selected or placed in box 736, and/or when a refresh list option is selected via options 739.

Figure 7D:
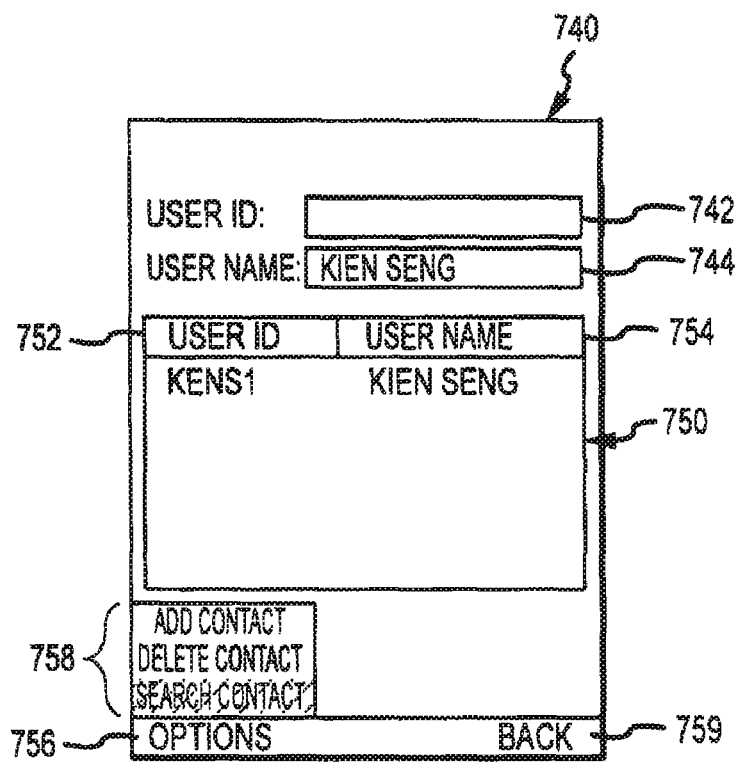
Figure 7E:
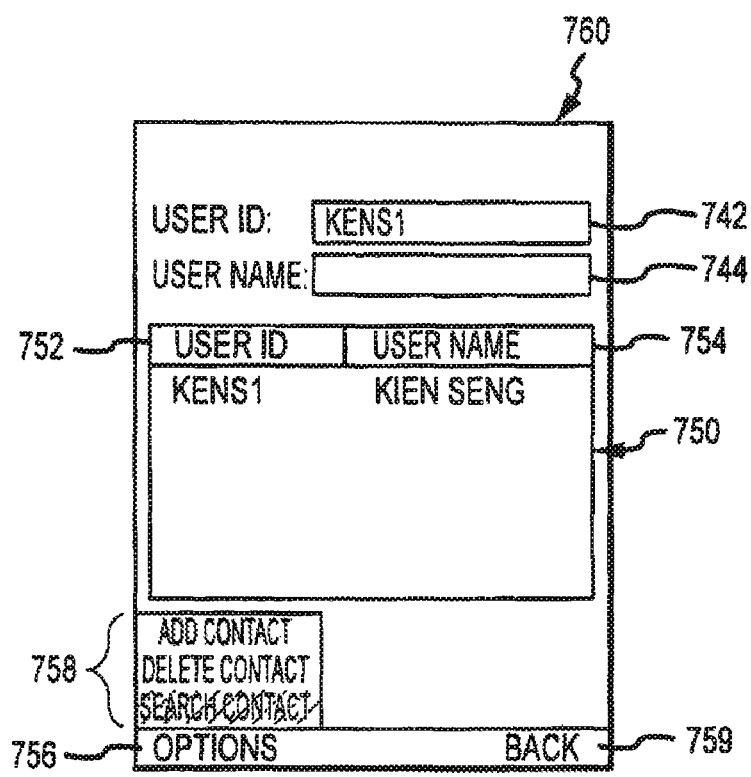

FIG. 7D illustrates another display screen 740 that may be generated by the client program 620 to facilitate operation of the client device 610 in system 600. The display 740 includes a user ID data box 742, a user name data box 744, and a contact list 750 arranged by a user ID column 752 and a user name column 754. The display 740 also includes an option button 756 that is selected to show add contact, search contact, and delete contact options. A back button 759 is also provided to navigate to a prior screen/display. The search contact option 758 is selected in the display 740 and a name is entered in the user name box 744, which causes the client program 620 to initiate a search for the device user to find a contact or buddy within the system 600 (e.g., to determine whether the person is a registered user in the system as may be identified by the login server 680 via its data service 686 searching user accounts 689 for a user profile 690 with a matching user name 692). If a contact is found via such a search, the user may initiate a request to add that found contact to his contact or buddy list 750. FIG. 7E illustrates a similar user screen 760 that may be displayed on the device monitor or display screen such as when a user attempts to search for his buddies or contacts among the system's registered users by user ID. This may be useful if two users exchange this information so that they can be on each other's contact list, and if found, their name/information may be displayed in the list 750 (or this may not be done until they grant permission to have their name added to the list 750 of the user).

Figure 7F:
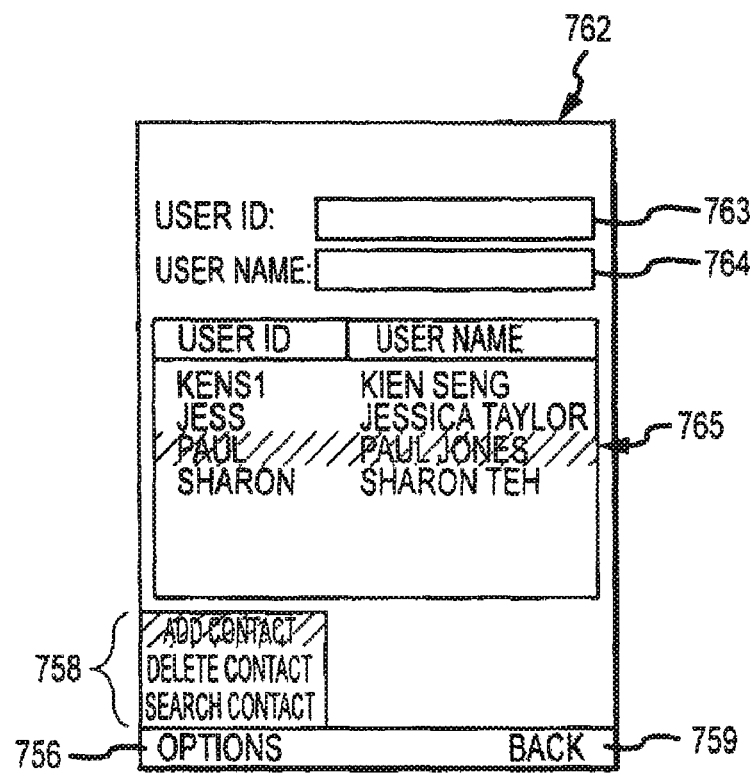
Figure 7G:
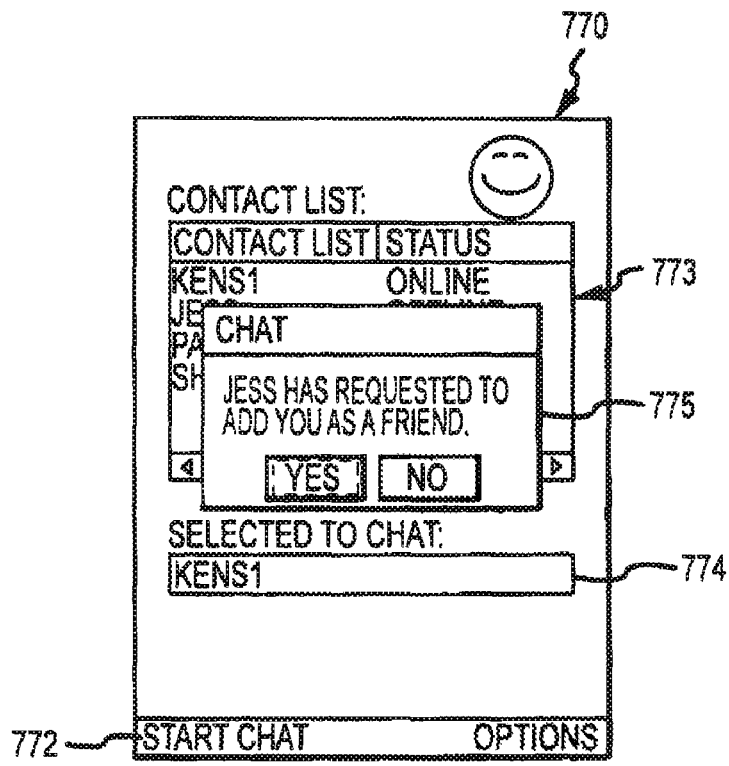

For example, the screen 762 of FIG. 7F may be displayed with a user ID box 763, a user name box 764, and list 765 when a user selects the add contact option/action 758. The screen allows a user to add a contact to his contact list with explicit permission being obtained at this point or provided earlier by the target, registered user or contact. In FIG. 7G, a screen 770 is created and displayed by the client program 620 with a contact list 773 and a select to that box 774 (in which a user on the user's contact list 773 has been chosen for a chat/communication link over system 600), and a start chat button 772 is provided to allow the user to request a chat with the user in box 774. Typically, the system 600 will act to determine if the status is online, the user wishes to speak with the user at this time (he may deny the requested contact), and whether the user has adequate free talk credit time 696 in his user account 689 to begin a session (e.g., time is at least 1 minute or a larger value such as at least 5 minutes). The display 770 further includes a pop up window/box displaying a notification that there is a pending request from a user or party of the system 600 to obtain the user's permission to be added to his buddy list. Again, the user may choose to grant permission (e.g., select the "Yes" button in notification pop up/window 775) or to deny permission (e.g., select the "No" button in window/box 775), and in some embodiments each user may approve or reject such a request to be added to a buddy or contact list.

Figure 7H:
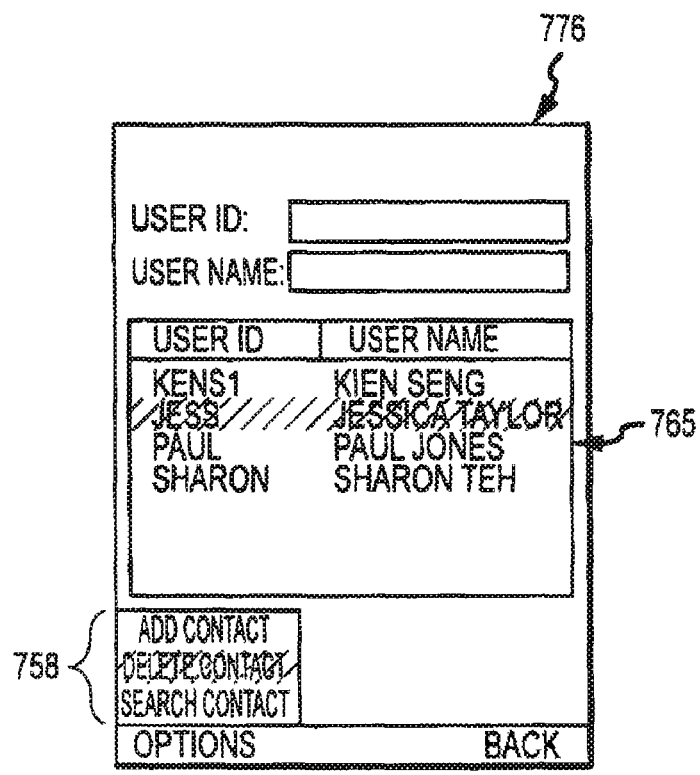
Figure 7I:
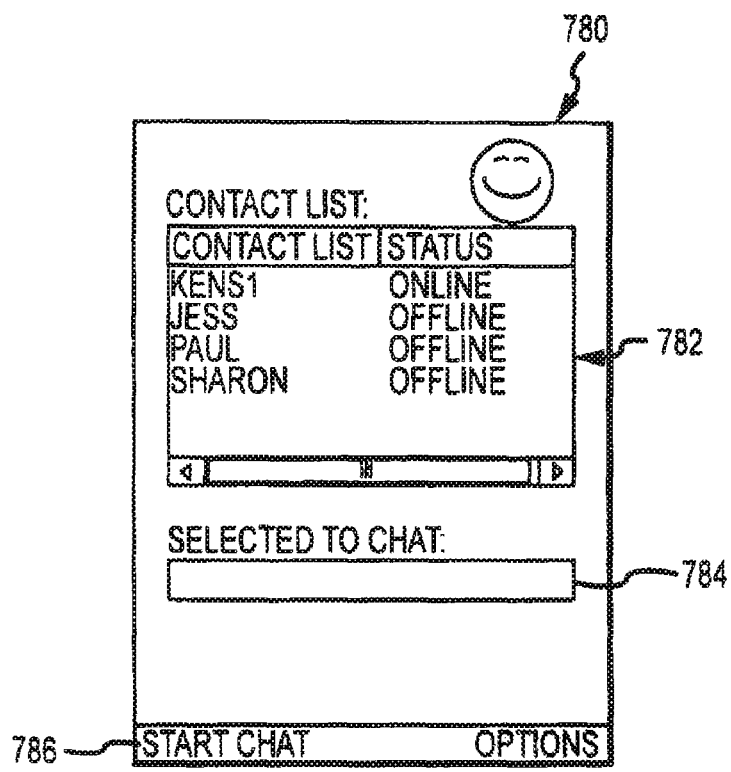

FIG. 7H illustrates another screen 776 that may be created and displayed by the client program 620 on the user device 610 during operation of the system 600. The screen or user interface 776 may be displayed to allow a user of a client device 610 to remove or delete a contact or buddy from his contact list 698 (such as the name highlighted or selected such as with a keypad, scrollbar, mouse, or other user I/O device on the phone or user device 610). Once a buddy or contact is removed from a contact list 698, the login server 680 or zone controller 660 may require that new permission be granted by that user to add that person back onto the user's contact list 765 (even though he has previously been on the list 698). FIG. 7I illustrates another user interface or screen 780 generated by the client program 620 and includes a contact list 782 showing registered users/contacts by their user name and also providing the user's status. The screen 780 also includes a select chat or chat initiation box 784 in which a user from the list 782 (an online user or the like) may be added and chat started by selecting button 786. Typically, as discussed above, the user will use the screen 780 to request a communication session be established via a cell server 640 and a login server 680 (which may verify that the requesting user has adequate free talk credit time 696) and often the contact or user will be a remote contact such as one in another zone 606 and communication will be via the Internet 604 and via short-range wireless communication between the device 610 and the cell server 640.

Figure 7J:
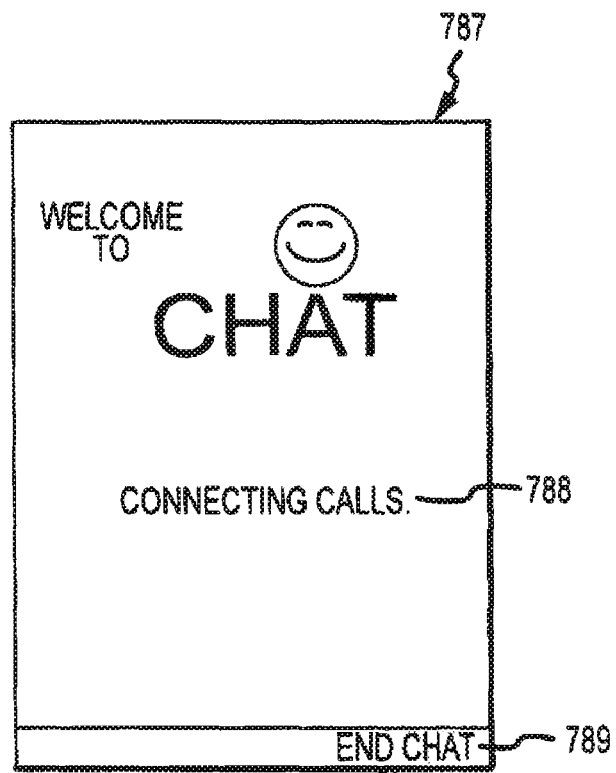

FIG. 7J shows another user interface or screen 787 that may include a text/video display area 788 indicating present communication status such as connecting to a requested target user, connection successful/good, amount of time left for the user in the talk credit time 696, or other information related to the ongoing call. Additional information that may be displayed may include the physical location of the target user (e.g., the location of the zone 606 or cell within the zone 606 containing the registered user such as a store within a mall, a restaurant in a city, and so on). The information section 788 may also be used by the client program 620 to display the name (user name and/or user ID of the user chatting with the user device 610). The screen may also display a button "end chat" 789 providing the user of the device displaying the screen 787 to terminate the call that is in progress. In a typical embodiment, the screen 787 may be displayed upon both the requesting and target/receiving device or phone 610 and either party may end the call or chat session such as by selecting the end chat button 789 (or closing his phone 610, turning his phone 610 off, or by other techniques).

Figure 7K:
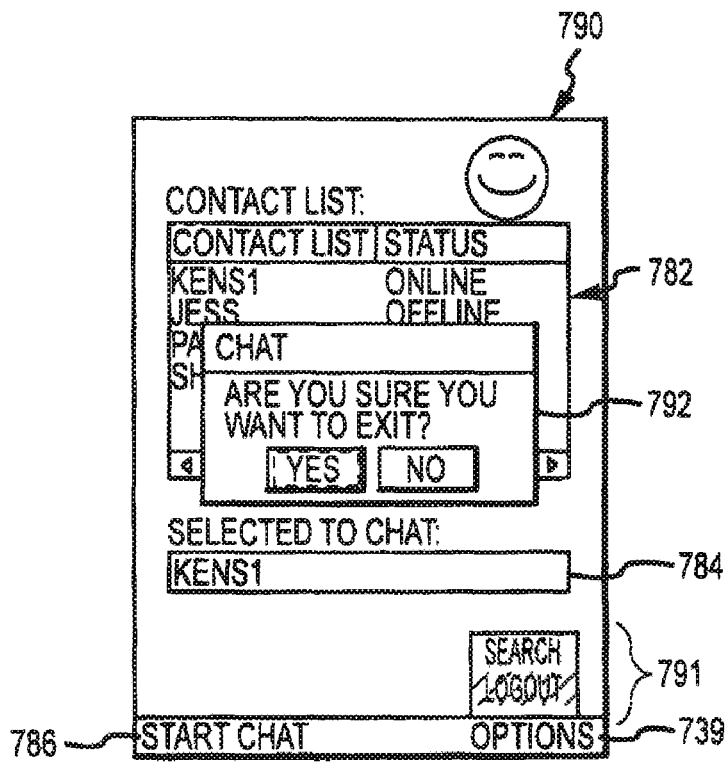
Figure 7L:
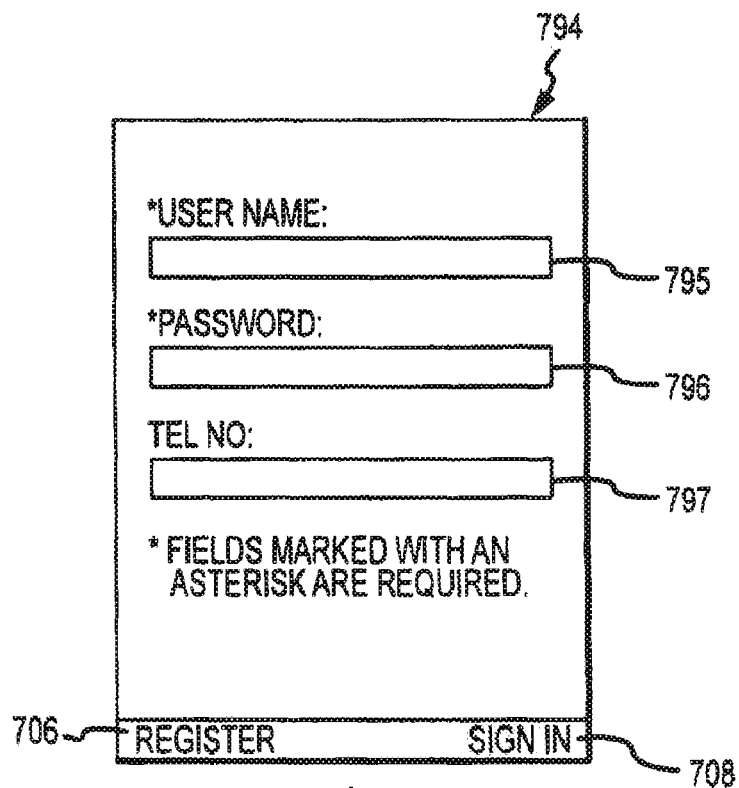

FIG. 7K shows a user interface or screen 790 with a contact list 782, a box 784 indicating a user selected from the list 782 for a chat session, a start chat button 786, an options button 739, and a pop up/pull down menu 791 of options. When the logout option is selected as shown, a popup window or box 792 is displayed in screen 790 providing a user of a device 610 to choose to logout from the system 600. In other embodiments, the user may logout of the system 600 by powering off their device (e.g., no longer Bluetooth discoverable or the like), leaving a zone/cell of the system, or by other means. FIG. 7L shows yet another screen 794 that may be generated by the client program 620 that includes a user name box 795, a password box 796, and a telephone number box 797 (e.g., boxes for entering data related to the user and/or his device 610). The screen 794 may be used to allow a user to register with the system 600 and create a user account 689. In this case, the user may be able to select his user ID and a password by entering information into boxes 795 and 796. In other embodiments, the user may be prompted to enter additional information to obtain additional talk credit time such as demographic information and/or permission or agreement to receive one or more types of proximity marketing or similar contents that are distributed by the system 600. Note, the system 600 does not illustrate marketing or campaign servers, but these typically would be connected or linked to the Internet 604 and provide contents to servers 640, 660 for distribution to client devices 610 typically in exchange for free talk credit time 696 (as discussed in detail above).

Figure 8:
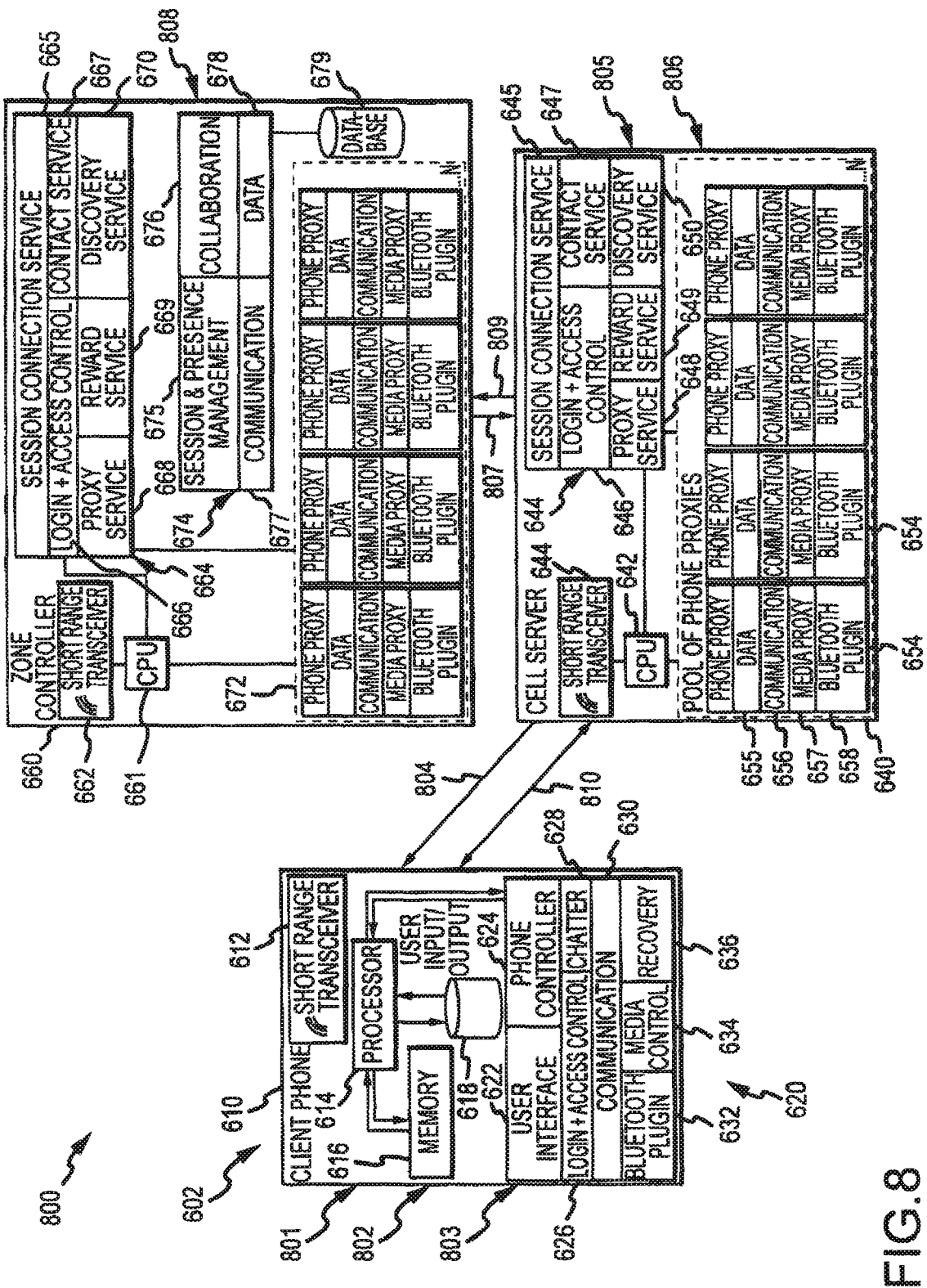
FIG. 8 illustrates a portion of the communication system of FIG. 6 illustrating steps of a communication management method to communicate configuration information/data between a client program of a cell phone or device of a registered user and management portions/servers of the communication system.
Figure 9:
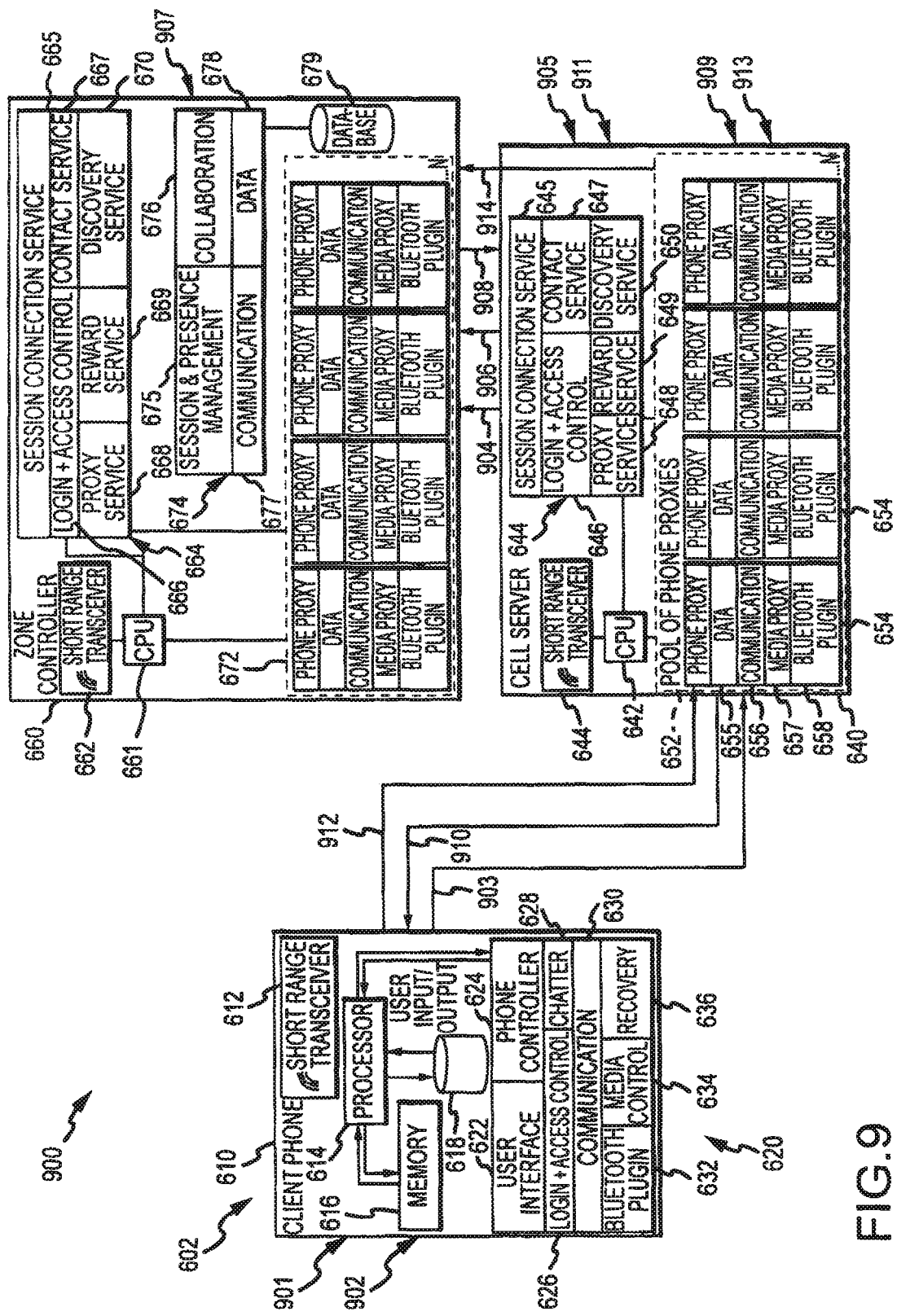
FIG. 9 illustrates a portion of the communication system of FIG. 6, similar to FIG. 8, showing steps or module communication/data transfer during connection setup of a registered cell phone or user device with the communication system.
Figure 10:
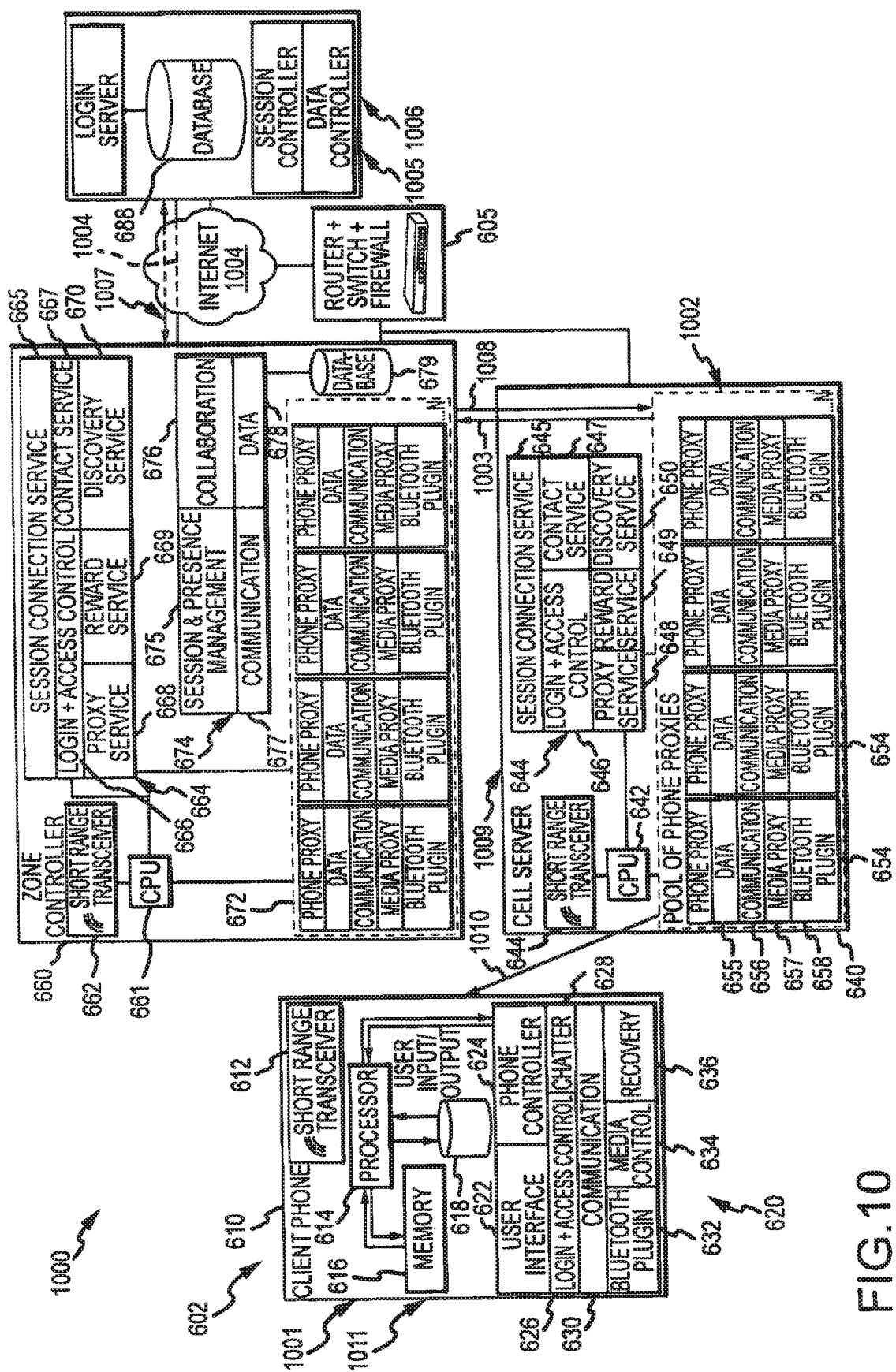
FIG. 10 illustrates a portion of the communication system of FIG. 6, similar to FIGS. 8 and 9, showing steps or module communication/data transfer during a client login to the communication system via a cell phone or other user device.

At this point, it may be useful to describe the communication system 600 during operation to allow a user of a short range-enabled device such as a Bluetooth or similar cell phone to access the system 600 and communicate with his contacts via a network such as the Internet. In this regard, FIGS. 8-10 illustrate portions of the communication system 600 (with the components/elements maintaining the same numbers as in FIG. 6) during particular operations with steps or functions indicated with circled numbers. FIGS. 8-10 along with FIG. 6 provide systems implemented using Bluetooth technology, but the invention is not limited to such implementations but more generally provides a communication session that is established between two client devices typically in exchange for at least one of the users agreeing to receive and, in some cases, to respond to or take actions based upon media contents such as proximity marketing data. Typically, at least one of the client devices will be a short-range enabled device that communicates wirelessly with a cell server (e.g., the device and server are Bluetooth enabled or enabled for short range communication with other technology).

FIG. 8 shows a communication system 800 during configuration of communication between a client program 620 of a cell phone 610 of a registered user and the system (e.g., the cell server 640 and other registered users via their client devices, which may be cell phones or other short range-enable devices). In step/function 801, a registered user starts the client program 620. In some embodiments, a user has to successfully register with the system 800 prior to communicating over the network with other users (e.g., have a user account 689 established via a login server for his device 610). After or during a successful registration, a client program 620 is installed in the registered device 610 of the registered user. Each client program 620 has a configuration file (not shown in FIG. 6 or 8 but provide in memory of device 610) that contains, among other parameters, a cell address attribute and a cell name attribute. The cell address attribute provides the IP address and the port number of the cell server responsible to detect and provide the initialization service with the client program of the incoming cell phone. The cell name attribute provides the name of the cell server responsible to detect and provide initialization service with the client program of the incoming cell phone. When a registered user wants to use the services provided by the system 800, he activates the client program 620 by operating I/O devices of his client phone 610.

At step/function 802, the user with a device 610 upon which the client program 620 is activated steps into the proximity of a cell server 640 (i.e., the user with his device 610 enters a cell of the system 800. Outside the cell, the cell server 640 (and no other cell server of system 800) is able to reach/discover the device 610 with its transceiver 644 and discovery service 650, which is significant because for the device 610 to use the system 800 the cell server 640 reaches out or communicates with the client program 620 of the cell phone 610 of the registered user. At step/function 803, the user switches on the Bluetooth system of the cell phone 610. When the registered user and his device 610 are within a cell of system 800 (or before they enter the cell), he can switch on the Bluetooth system of his cell phone 610 so that his cell phone 610 is discoverable by other Bluetooth-enabled systems including the cell server 640. In other words, the registered user enables the Bluetooth system (or other wireless short-range communication technology/components) of the cell phone 610 to make it visible to cell servers 640 within a cell.

At step/function 804, the cell server 640 detects the cell phone 610. Since each server within the zones (such as zone 602) of the system 800 is Bluetooth-enabled, the cell server 640 of the cell where the cell phone 610 is positioned is able to identify the device 610 of the registered user through the discovery service 650 of the cell server 640. In other words, if the user is within a cell of the system 800, the cell server 640 acts to identify the unique 6-byte hexadecimal Bluetooth ID of the cell phone 610 when it detects the presence of the cell phone 610 within the range of its transceiver 644 (e.g., within the radius or boundaries of the cell). The discovery service 650 of the cell server 640 causes the server 640 to periodically scan the area of the cell around the server 640 via Bluetooth radio and transceiver 644 to discover if there is another Bluetooth-enabled, discoverable device in its proximity. Typically, the range of the coverage of a cell server may span between a few centimeters to a few hundred meters. After each scan of a cell, the discovery service 650 may pause for a few seconds or more and then repeat the discovery cycle/process until the cell server 640 is terminated or made inoperable (e.g., powered down at the end of a day such as in applications where the system 800 is only available to users during business or operating hours of a particular facility such as a mall, an entertainment complex, and the like).

At step/function 805, the cell server 640 checks its cache (not shown) for a list of available zone controllers such as zone controller 660. In each zone 602, there may be one or more cell server that is designated as a zone controller. As such, each cell server 640 operates to locate an active zone controller 660. Among other methods, each cell server 640 may search a list of connection addresses of the active zone controllers in its cache/memory, and such a cache may be a registry or a file located in the memory of the cell server or accessible by the server 640. At step/function 806, the cell server identifies the zone controller 660 for system 800 communications. For example, once a list of connection addresses of the active zone controllers is identified, the cell server 640 may check with zone controller 660 about the status of registration within the system 800 of the discovered devices within the cell such as the Bluetooth-enabled device 610 it discovered in step 804.

At step/function 807, the cell server 640 determines if a configuration file should be sent to the cell phone 610. At the cell server 640, the session connection service 645 checks if it has processed the device in a valid session. It typically will raise or transmit a message request populated with the unique 6-byte hexadecimal Bluetooth ID (i.e., device ID) of the detected device 610 and its cell server ID to the zone controller 660 for performing the verification (e.g., by checking its cache for the device ID and/or contacting the login server 680). At step/function 808, the zone controller checks if the cell phone 610 needs to be updated with a new configuration. Once a zone controller, 660, via its communication service 677, receives a request for status of a Bluetooth-enabled device based on the unique 6-byte hexadecimal Bluetooth ID of the detected device 610, the zone controller 660 checks its database 679 via its data service 678. The zone controller 660 establishes if it is necessary or desirable to send a new configuration file to the cell phone 610 based on the use of the following parameters: (a) the date and time the cell phone was last discovered; (b) the date and time the cell phone last received a configuration file; (c) the connection address of the cell server to which the cell phone last connected; (d) the date and time the cell phone last logged into the system; and (e) the date and time the cell phone last logged out of the system. If any of the following scenarios holds true, the zone controller 660 notifies the requestor cell server 640 to send a new configuration file to the cell phone 610 to be processed by the client program 620. First, the zone controller 660 determines whether the date and time the cell phone 610 last received a configuration file is prior to the date and time the cell phone 610 was last discovered, and second, the zone controller 660 determines whether the date and time the cell phone 610 last received a configuration file is unknown.

At step/function 809, the zone controller 660 returns a response to the cell server 640. Once the session and presence management service 675 of the zone controller 660 gathers the status of the configuration of the cell phone 610, it attempts to channel or transmit the status to the cell server 640. At step/function 810, the cell server 640 sends a configuration file (if appropriate) to the cell phone 610. Upon receiving the status from the zone controller 660, the session connection service 645 of the cell server 640 attempts to send a configuration file to the cell phone 610. At this point, since there is no connection established between a phone proxy 654 and the client program 620 of the cell phone 610 via the media control service 634, the configuration file is typically sent via the Bluetooth service using the object exchange profile, for example. When the cell server 640 offers to send such a configuration file to the user, a prompt may be displayed on the screen/display of the cell phone 610 of the user. The user then has the option to receive or reject the file as offered. If it is accepted, it is saved to a local folder (not shown) in the cell phone memory of the registered user. Once a configuration file is sent to a client program 620, the cell server 640 informs the zone controller 660 the status of receipt of configuration by the client program 620 of the cell phone 610.

FIG. 9 illustrates a communication system 900 operating to provide connection setup of a registered cell phone 610 or user of such a device with the communication system (e.g., to receive proximity marketing contents, to manage his contact list, to chat/communicate with other registered users, and the like). At step/function 901, the registered user starts the client program 620 on his cell phone 610. As noted above, when a registered user decides to use the communication services of the system 900, he has to move into a cell of a zone 602 that is covered by the system 900. Once he is physically present within the cell covered by a cell server 640, he activates the client program 620 to allow him to use his device 610 to communicate with the system 900 and other registered users. At step/function 902, the client program 620 acts to locate a connecting cell server 640 such as with a look up from a local configuration file in memory of device 610. For example, when the registered user makes his cell phone 610 Bluetooth-enabled and discoverable by Bluetooth, the server 640 serving the cell in which the cell phone 610 is located is able to discover its unique 6-byte hexadecimal Bluetooth ID. The system 900 updates the client program 620 with the appropriate configuration file if and when it is necessary as discussed with reference to FIG. 8.

At step/function 903, the client program 620 sends a connection request to the connecting cell server 640 of system 900. At this point, the client program 620 of the cell phone 610 has access to an up-to-date configuration file that is valid within the cell of the zone 602 in which the cell phone 610 is located. The communication service 630 of the client program 620 attempts to connect to the contact service 647 of the cell server 640 whose IP address is contained in the configuration file. Given a certain pre-defined load of processing, the cell server 640 may be able to handle a large number of simultaneous/concurrent connection requests from client programs in the serviced cell. The contact service 647 makes available a pool of connections (as shown with pool of proxies 652) to allow as many incoming requests to connect to the cell server 640 as possible (or as practical). When such a pool of connections is exhausted, the subsequent incoming requests to connect may be placed on a waiting list or queue to be serviced later by the cell server 640.

At step/function 904, the cell server checks its cache for a list of available zone controllers. The cell server 640 decides if it is ready to allow the client program 620 to connect to the system 900. To this end, the cell server 640 checks with the zone controller 660. First, the cell server 640 checks in its cache list of the available, active zone controllers that may be able to offer such a connection/session service within the zone 602. The cache may be stored in a local file in a folder (in memory not shown in FIG. 9) of the cell server 640 or otherwise be accessible by the server 640. Once a list of such zone controllers is found, the cell server 640 tries to find the first available zone controller (e.g., zone controller 660) that is active such as through the use of network socket ping over the IP network linking the servers of the system 900. At step/function 905, the cell server 640 identifies a zone controller to communicate with to service the cell phone 610. Once an active zone controller 660 is identified, the contact service 647 of the cell server 640 constructs a message to initiate a request to connect to the system 900 on behalf of the connecting client program 620 of the cell phone 610.

At step/function 906, the cell server 640 relays the connection request to the targeted zone controller 660. Once a request to connect message is formed, the contact service 647 of the cell server 640 attempts to relay the connect request to the targeted zone controller 660. The communication service 677 of the targeted zone controller 660 interprets/processes the contents of the message(s) flowing into the zone controller 660. At step/function 907, the zone controller 660 determines whether or not to allow the cell phone 610 to connect to the system 900. The zone controller 660 checks if the requestor client program 620 of the cell phone 610 shall be connected to the system 900 by verifying that it has been sent an up-to-date configuration file. Once the status of receipt of such a configuration file by the client program 620 is verified, the zone controller 660 typically will allow the connection request by the requestor client program 620 to proceed. The result of the connection request is channeled or transmitted via the communication service 677 of the zone controller 660 to the contact service 647 of the requestor cell server 640.

At step/function 908, the cell server 640 receives the response from the zone controller 660 to allow (or deny) the new connection of the cell phone 610 to the system 900. Once the contact service 647 of the cell server 640 receives a response from the zone controller 660, it interprets the content of the response. If a connection request is disallowed, the connection request is ignored (or a message indicating a denied request is transmitted to the device 610). Otherwise, the contact service 647 communicates internally with the proxy service 648 to establish the load and the availability of system resources to accept the connection request. If the proxy service 648 has exceeded the maximum number of connection clients/proxies 654, then the connection request may be denied or queued for later processing. At step/function 909, the cell server 640 allocates a phone proxy 654 from the available pool 652 of phone proxies. The proxy service 648 manages a pool 652 of active phone proxies 654. It manages the life cycle of the available phone proxies 654 in part to maximize the service availability of the services provided by the system 900. Once the proxy service 648 has approved a connection request with an allocated phone proxy 654, it may collaborate with the contact service 647 to initiate the assignment or association of a phone proxy 654 to or with the requestor client program 620 of the cell phone 610.

At step/function 910, the cell server 640 assigns a connection address to the client program 620. Each connection request is typically assigned an Internet address within the IP network of the zone 602. Once an Internet address is available, it is assigned to the connecting client program 620 of the cell phone 610 to enable the latter to connect to the network 604 of the system 900. At step/function 911, the cell server 640 associates the phone proxy 654 with the client program 620 of the cell phone 610. Once the client program 620 is assigned an Internet address within the IP network of the zone 602, it is associated with a phone proxy 654 that is allocated by the proxy service 648 of the cell server 640. Each phone proxy 654 typically has a well-known Internet address and an associated port number through which the phone proxy can communicate with any other external entity or program via the IP network communication.

At step/function 912, the client program 620 activates the phone proxy 654 to acknowledge its association with the assigned phone proxy 654. When the client program 620 successfully connects with or to the system 900, the media proxy 657 of the phone proxy 654 is able to communicate with the communication service 630 of the client program 620 via the respective Bluetooth plugin 632 over the Bluetooth radio (see transceivers 612, 644). After a brief exchange of messages to confirm the activation status of both the communication service 630 of the client program 620 and the communication service 656 of the phone proxy 654, the association between the client program 620 and the phone proxy 654 will be established and made known to the contact service 647 of the cell server 640.

At step/function 913, the phone proxy 654 checks its cache to identify the zone controllers. After a successful association between a connected client program 620 and the assigned phone proxy 654, the phone proxy 654 verifies/establishes association with the zone controller 660. Such information of the association is useful as each user who logs into the system 900 is associated with a phone proxy 654 before communication can be relayed to its associated client program 620 of the cell phone 610. Through the cache information of the cell server 640 in which the phone proxy 654 resides, the phone proxy 654 identifies the zone controller 660 in order to verify the association. At step/function 914, the phone proxy 654 informs the zone controller 660 of its association with the client program 620 of the cell phone 610. Once the zone controller 660 is identified, the phone proxy 654 typically will channel or transmit a verification message via the communication service 677 to the session and presence management service 675 of the zone controller 660 via the local network communication over the IP network within the zone 602.

FIG. 10 illustrates a communication system 1000 during operations to login a client/user to the system 1000 via his short range-enabled device such as a cell phone 610. At step/function 1001, a registered user enters his login details/information via a user interface/screen (e.g., a screen as discussed in reference to FIGS. 7A-7L) such as his user ID and password. Once a registered user steps or moves into a cell of the system 1000 while also making the Bluetooth system of his cell phone 610 is discoverable by a cell server 640, the user may activate the client program 620 via his cell phone 610 (e.g., its I/O devices) to use the communication/chat services provided by the system 1000. Once the client program 620 is activated, the user may enter his user ID and password in order to attempt to log into the system 1000 via the login and access control service/module 626 of the client program 620.

At step/function 1002, the client program 620 relays the login details/information to its associated phone proxy 654 on the cell server 640. The user data may be channeled by the communication module 630 to the associated phone proxy 654 at the cell server 640 via the Bluetooth plugin 632. Since the associated phone proxy 654 has already been made known to the zone controller 660 via the assigned Internet address of the cell phone 610 within the network of the zone 602, the phone proxy 654 will receive the user login data to subsequently be presented to the zone controller 660. At step/function 1003, the phone proxy 654 relays the login data/details to the zone controller 660 in order to log the user into the system 1000. The associated phone proxy 654 relays the login details via the communication module 656 to the session and presence management module 675 of the zone controller 640. Essentially, the session and presence management module 675 of the zone controller 640 verifies the integrity of the login request. As part of the process of verifying the integrity of the login request, the session and presence management module 675 may set up the session related attributes such as, but not limited to, the transaction timestamp, the originating network address, and the frequency or number of access attempts. Once the integrity of the login attempt is verified or approved, the session and presence management module 675 collaborates with the login server 680 to complete logging the user into the system 1000.

At step/function 1004, the zone controller 660 communicates with the login server 680. The session and presence management module 675 of the zone controller 660 raises (generates and transmits) a login attempt message via its communication module 677 and channels it to the login and access module 682 of the login server 680. As the messages travel across the global Internet 604, it may be preferable to properly encrypt these messages using the established network communication security incorporating, among others, the public and private key of the communicating servers. Each zone controller 660 may keep a cache of the address of the login server 680. Sufficient system redundancy may be built into the system 1000 to improve the service availability of the login server 680, such as by deploying the latter on a high-availability system covering the database 688, power supply units, and the like.

At step/function 1005, the login server 680 verifies login credentials of the requesting user. Upon receiving a verification request for a login attempt, the login and access module 682 of the login server 680 may check with or do a look up/compare in its database 688 of the user accounts 689. Among other measures to enhance security and integrity of the user data in the user accounts 689, the user passwords 693 may not be stored in their original forms but instead in the form of hashes. For example, such a hash may be generated based upon a set of parameters derived from, among others, the user password entered by a user as part of registration or managing his account 689 or user profile 690 and the unique 6-byte hexadecimal Bluetooth ID of the registered cell phone (e.g., the user's device ID). At step/function 1006, the login server 680 updates login details in the user account 689 record associated with the login request in its data structure 688. If the login credentials are validated, verified, and authenticated (e.g., match the data/information in the user profile 690), the login and access module 682 of the login server 680 may update the details of the login transaction to its main database/ data structure 688. Among the updated parameters are the address of the originating cell server 640 and its phone proxy 654, the originating zone controller 660, timestamps of the transaction, and the frequency or number of login attempts.

At step/function 1007, the login server 680 returns a contact or buddy list 698, and a status (and/or other information in the contact records 699 associated with the list 698) of each user/buddy on the list 698 to the zone controller 660. As part of the management of the contacts/buddies of a user, the system 1000 may delegate the task of managing the contact list 698 of a registered login server 680 through its data service 686. If a user has added at least one buddy/user to his list of contacts with whom he may want to communicate using system 1000, the data service 686 may retrieve a buddy or contact list 698 associated with or linked to the registered user (e.g., via their user account 689 or profile 690) to the zone controller 660 to then be forwarded to the associated phone proxy 654 of the user residing at the corresponding cell server 660. At step/function 1008, the zone controller 660 relays the contact list 698 to the phone proxy 654. Once the zone controller 660 has received a positive acknowledgement of the login attempt of the user, it will also retrieve from the response a list of buddies/contacts with whom the user may communicate. Once the list is retrieved from the acknowledgement response, the zone controller 660 sends it to the data service 655 of the phone proxy 654 provided for the registered and logged on user.

At step/function 1009, the zone controller 660 updates the presence of the user within the system 1000. The zone controller 660 may update its records/database to reflect the user's present status such as online, online but busy/not receiving, or the like. The status of each user that has successfully logged onto the system 1000 may then be shared with other interested parties such as to provide accurate data on a contact list of another user that logs onto the system 1000 and depending upon the options the logged-in user has set for chatting with buddies/contacts or visibility of his presence to this buddies/contacts (e.g., to provide user-selectable/definable privacy options in some applications). At step/function 1010, the phone proxy 654 relays the buddy or contact list to the client program 620 of the cell phone 610. Once the data service 655 of the phone proxy 654 of the registered and logged on user has received a related contact or buddy list, it will channel or transmit the list or its data/details to the chatter module 628 of the cell phone 610 via the Bluetooth plugin 632. At step 1011, the client program 620 may display the received contact/buddy list such as in a user interface or displayed screen on a monitor or display element of the phone 610 (as discussed with reference to FIGS. 7A-7L), and the displayed contact list may include the present status of each of the contacts within the system 1000. When a user has at least one buddy/contact that is logged onto the system, the chatter module 628 may indicate the status of that user is online and then allow the user to make a voice chat or link with that contact (or at least submit a connection/chat request that may be refused by the online contact). The status of availability for chat or connection of each contact/buddy may be displayed to the user (and, in some cases, not just those that are online although the chatter module 628 may block the user from entering connection/communication requests to such offline users).

With reference to FIG. 6, it may be useful now to discuss how the communication system 600 may operate to locate the presence of a registered user that has logged into the system 600 via his preferred device 610. When a registered user attempts to log into the system 600 from the client program 620 running on his cell phone 610, the login and access service 626 of the client program 620 validates and accepts the login details/information entered by the user via the phone's I/O devices such as his user ID and their password. Once the login details are accepted, the communication service 630 of the client program 620 of the cell phone 610 relays the login details/data to the associated phone proxy 654 via the Bluetooth plugin 632. When the media proxy 657 of the phone proxy 654 residing at the associated cell server 640 receives the login details via the Bluetooth plugin 658, the login details/data are shared with the data service 655 of the phone proxy 654. From the cache stored in the cell server 640, the phone proxy 654 identifies the address of a zone controller 660 that is active within the zone 602 in which the cell server 640 resides. When the address of the zone controller 660 is identified, the phone proxy 654 attempts to communicate with the zone controller 660 via secure network socket communication within the local IP network.

The zone controller 660 typically is able to uniquely identify the phone proxy 654 associated with the client program 620 of the cell phone 610. When a registered user has been assigned a phone proxy 654, the address (e.g., the network socket address) of the phone proxy 654 is updated by the zone controller 660 in the zone database 679. A zone controller 660 may keep a record of a phone proxy 654 associated with a user as follows:

User-Phone Proxy

| # | Attribute | Description |
| --- | --- | --- |
| 1 | User_ID | The unique user id of each registered user of the system |
| 2 | Address_device | The IP address and the port number of the connecting client program of the cell phone. |
| 3 | Address_proxy | The IP address and the port number of socket of the phone proxy. Its IP address is that of the cell server connected with the client program of the cell phone. |

When a user intends to set up a voice chat with an online remote contact, the user ID of the remote contact may be selected by the chatter module 628 of the client program 620 of the phone 610 such as in response to data entry or name/contact selection by a user via a user interface/data entry screen (see, for example, FIGS. 7A-7L). It is then shared with the data service 655 of its associated phone proxy 654 that resides at the cell server 640 that is responsible in initializing the connection with the client program 620 of the cell phone 610. The phone proxy 654 may first attempt to check with the session and presence management module 675 of the active zone controller 660 within its zone 602 to locate the remote contact wanted by the requesting or calling party/user. Upon receiving the request, the session and presence management module 675 may communicate with the login and access module 682 of the login server 680. As the login server 680 keeps track of the full location details of a successfully connected user, it may share the location details/information of the remote party and his status with the session and presence management module 675 of the requesting zone controller 660 to facilitate linking and establishing a chat session between the two registered users that use their short ranged-enabled devices 610 to communicate with the cell server 640 and then with each other over the network 604. Again, the chat session is generally limited to the amount of chat time or talk time that has previously been awarded to the requesting user (although some embodiments may allow time earned by the targeted party/user to also be used in the session such as upon expiration of the requesting party/user's time). At this point, a cell server may transmit messages indicating the available talk credit time 696 associated with the requesting user/user device and may provide one or more ways for the user to earn additional talk/chat time (e.g., buttons on user interfaces/screens that cause the user device to receive media contents such as proximity marketing contents from an ongoing advertising campaign associated with the zone in which the linked cell server is located or the like).

I claim:

1. A computer-based method for providing communication between short-range wireless devices over the Internet or other digital communication network, comprising:
    providing first and second servers communicatively linked to a digital communication network, each of the servers being adapted for communicating wirelessly with the short-range wireless devices within a first cell and a second cell, respectively, about the first and second servers;
    detecting with the first server a user device adapted for short-range wireless communication within the first cell including determining an identifier of the user device;
    based on the identifier, retrieving a contact list from memory listing a set of users of communication devices adapted for short-range wireless communication;
    receiving a request from the detected user device to communicate with a target one of the user devices on the contact list;
    establishing a communication session between the detected user device and the target user device, wherein the communication session includes transferring data between the detected user device and the target user device via the first server, the communication network, and the second server;
    transmitting to the detected user device a request to media contents to the detected user device;
    receiving consent to receive the media contents from the detected user device;
    transmitting the media contents to the detected user device;
    modifying a user profile associated with the target user device to increase an amount of available free talk credit time associated with the target user device based upon receiving the consent to receive the media contents;
    prior to the establishing the communication session, determining an amount of available free talk credit time is eater than zero;
    monitoring a length of the communication session; and
    terminating the communication session when the length exceeds the amount of available free talk credit time.

2. The method of claim 1, wherein the detected user device, the target user device and the first and second servers are enabled to communicate over a distance of less than about 300 meters according to a wireless communication protocol and wherein the communication between the detected user device and the first server and between the target user device and the second server are performed according to the wireless communication protocol.

3. The method of claim 2, wherein the wireless communication protocol is the Bluetooth protocol and the detected and target user devices are Bluetooth-enabled devices.

4. The method of claim 3, wherein the detected and target user devices are cell phones.

5. The method of claim 4, wherein the first and second cells have radii of less than about 300 meters.

6. The method of claim 1, wherein the data transferred during the communication session comprises voice data.

7. The method of claim 6, wherein the first and second servers are configured to support the Voice over Internet Protocol (VoIP), whereby voice messages received at the first and second servers from the detected and target user devices are converted into digital data according to the VoIP prior to transmitting over the communication network between the first and second servers.

8. The method of claim 1, wherein the amount of available free talk credit time is increased differing amounts for differing types of the media contents and further comprising incrementing the amount an additional amount when a user of the user device performs additional actions based on receipt of the media contents, whereby the user may be encouraged to purchase products or services, to visit a location, and to provide responsive information.

9. The method of claim 1, further including transmitting the contact list to the detected user device and prior to the transmitting, logging a user of the detected user device onto a communication system including receiving a user ID and a user password from the detected user device, comparing the user ID and user password to information stored in a user profile record linked to the device identifier.

10. A proximity marketing system, comprising:
    a data structure storing user account data for a plurality of users of short-range communication devices, the user account data including user identification information, an identifier for one of the communication devices, and an amount of talk time; and
    a plurality of cell servers positioned in spaced apart locations and communicating with each other over a digital communication network, wherein each of the cell servers functions to discover proximate ones of the short-range communication devices including obtaining the communication device identifiers, to log the discovered ones of the short-range communication devices onto the proximity marketing system based on a comparison of the obtained communication device identifiers and user identification information received with the user account data in the data structure, and to provide communication services to the logged-on devices including transmitting voice data from one of the logged-on devices to another one of the logged-on devices over the digital communication network,
    wherein the communication services are provided by the cell services for a period of time less than about the amount of talk time for the one of the logged-on device,
    wherein the cell servers further function to transmit requests to the discovered ones of the short-range communication devices to allow transmittal of proximity marketing contents to the discovered ones, to receive a grant of permission from at least a subset of the discovered ones to transmit at least a portion of the proximity marketing contents, and to transmit the permitted portion of the proximity marketing contents to the subset of the discovered ones, wherein the amount of talk time is increased for the subset of the discovered ones based on receipt of the proximity marketing contents, and
    wherein the user account data further includes content receipt settings defining one or more types of media contents for which at least periodic transmittal by the cell servers is permitted and wherein the amount of talk time is incremented by a predefined amount for each of the transmittals of the media contents to the user device.

11. The system of claim 10, wherein the user account data further includes a contact list listing a set of the users of the communication devices and wherein the provided communication services include presenting the contact list to one of the logged-on devices, receiving a request to establish a communication session with one of the users on the presented contact list, and establishing the communication session for a length of time less than about the amount of talk time associated with the requesting one of the users.

12. A computer-based method for providing communication between short-range wireless devices over the Internet or other digital communication network, comprising:
providing first and second servers communicatively linked to a digital communication network, each of the servers being adapted for communicating wirelessly with the short-range wireless devices within a first cell and a second cell, respectively, about the first and second servers;
detecting with the first server a user device adapted for short-range wireless communication within the first cell including determining an identifier of the user device;
based on the identifier, retrieving a contact list from memory listing a set of users of communication devices adapted for short-range wireless communication;
receiving a request from the detected user device to communicate with a target one of the user devices on the contact list;
establishing a communication session between the detected user device and the target user device;
transmitting to the detected user device a request to transmit media contents to the detected user device, receiving consent to receive the media contents from the detected user device, and transmitting the media contents to the detected user device;
modifying a user profile associated with the target user device to increase an amount of available free talk credit time associated with the target user device based upon receiving the consent to receive the media contents;
prior to the establishing of the communication session, determining an amount of available free talk credit time is greater than zero;
monitoring a length of the communication session; and
terminating the communication session when the length exceeds the amount of available free talk credit time.

13. The method of claim 12, wherein the communication session includes transferring data between the detected user device and the target user device via the first server, the communication network, and the second server and wherein the data transferred during the communication session comprises voice data.

14. The method of claim 13, wherein the first and second servers are configured to support the Voice over Internet Protocol (VoIP), whereby voice messages received at the first and second servers from the detected and target user devices are converted into digital data according to the VoIP prior to transmitting over the communication network between the first and second servers.

15. The method of claim 12, wherein the amount of available free talk credit time is increased differing amounts for differing types of the media contents and further comprising incrementing the amount an additional amount when a user of the user device performs additional actions based on receipt of the media contents, whereby the user may be encouraged to purchase products or services, to visit a location, and to provide responsive information.

16. A computer-based method for providing communication between short-range wireless devices over the Internet or other digital communication network, comprising:
providing first and second servers communicatively linked to a digital communication network, each of the servers being adapted for communicating wirelessly with the short-range wireless devices within a first cell and a second cell, respectively, about the first and second servers;
detecting with the first server a user device adapted for short-range wireless communication within the first cell including determining an identifier of the user device;
based on the identifier, retrieving a contact list from memory listing a set of users of communication devices adapted for short-range wireless communication;
receiving a request from the detected user device to communicate with a target one of the user devices on the contact list;
establishing a communication session between the detected user device and the target user device, wherein the communication session includes transferring data between the detected user device and the target user device via the first server, the communication network, and the second server;
transmitting to the detected user device a request to transmit media contents to the detected user device;
receiving consent to receive the media contents from the detected user device;
transmitting the media contents to the detected user device;
modifying a user profile associated with the target user device to increase an amount of available free talk credit time associated with the target user device based upon receiving the consent to receive the media contents, wherein the amount of available free talk credit time is increased differing amounts for differing types of the media contents; and
incrementing the amount an additional amount when a user of the user device performs additional actions based on receipt of the media contents, whereby the user may be encouraged to purchase products or services, to visit a location, and to provide responsive information.

17. The method of claim 16, wherein the data transferred during the communication session comprises voice data.

18. The method of claim 17, wherein the first and second servers are configured to support the Voice over Internet Protocol (VoIP), whereby voice messages received at the first and second servers from the detected and target user devices are converted into digital data according to the VoIP prior to transmitting over the communication network between the first and second servers.

19. The method of claim 16, further including transmitting the contact list to the detected user device and prior to the transmitting, logging a user of the detected user device onto a communication system including receiving a user ID and a user password from the detected user device, comparing the user ID and user password to information stored in a user profile record linked to the device identifier.

20. A computer-based method for providing communication between short-range wireless devices over the Internet or other digital communication network, comprising:
providing first and second servers communicatively linked to a digital communication network, each of the servers being adapted for communicating wirelessly with the short-range wireless devices within a first cell and a second cell, respectively, about the first and second servers;
detecting with the first server a user device adapted for short-range wireless communication within the first cell including determining an identifier of the user device;
based on the identifier, retrieving a contact list from memory listing a set of users of communication devices adapted for short-range wireless communication;

receiving a request from the detected user device to communicate with a target one of the user devices on the contact list;

establishing a communication session between the detected user device and the target user device;

transmitting to the detected user device a request to transmit media contents to the detected user device, receiving consent to receive the media contents from the detected user device, and transmitting the media contents to the detected user device;

transmitting to the detected user device a request to transmit media contents to the detected user device, receiving consent to receive the media contents from the detected user device, and transmitting the media contents to the detected user device;

modifying a user profile associated with the target user device to increase an amount of available free talk credit time associated with the target user device based upon receiving the consent to receive the media contents, wherein the amount of available free talk credit time is increased differing amounts for differing types of the media contents; and incrementing the amount an additional amount when a user of the user device performs additional actions based on receipt of the media contents, whereby the user may be encouraged to purchase products or services, to visit a location, and to provide responsive information.

21. The method of claim 20, wherein the communication session includes transferring data between the detected user device and the target user device via the first server, the communication network, and the second server and wherein the data transferred during the communication session comprises voice data.

22. The method of claim 21, wherein the first and second servers are configured to support the Voice over Internet Protocol (VoIP), whereby voice messages received at the first and second servers from the detected and target user devices are converted into digital data according to the VoIP prior to transmitting over the communication network between the first and second servers.

* * * * *

UNITED STATES PATENT AND TRADEMARK OFFICE
CERTIFICATE OF CORRECTION

| | | |
|---|---|---|
| PATENT NO. | : 8,089,943 B2 | Page 1 of 1 |
| APPLICATION NO. | : 13/183252 | |
| DATED | : January 3, 2012 | |
| INVENTOR(S) | : Lim | |

It is certified that error appears in the above-identified patent and that said Letters Patent is hereby corrected as shown below:

Column 37, line 34, after "request to", insert --transmit--.
Column 37, line 45, delete "eater" and insert therefor --greater--.

Signed and Sealed this
Twenty-eighth Day of February, 2012

David J. Kappos
*Director of the United States Patent and Trademark Office*